United States Patent
Umetsu et al.

(10) Patent No.: US 10,880,958 B2
(45) Date of Patent: Dec. 29, 2020

(54) INDUCTION HEATING DEVICE AND INDUCTION HEATING METHOD

(71) Applicant: NIPPON STEEL & SUMITOMO METAL CORPORATION, Tokyo (JP)

(72) Inventors: Kenji Umetsu, Tokyo (JP); Tsutomu Ueki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 220 days.

(21) Appl. No.: 16/069,453

(22) PCT Filed: Mar. 30, 2016

(86) PCT No.: PCT/JP2016/060426
§ 371 (c)(1),
(2) Date: Jul. 11, 2018

(87) PCT Pub. No.: WO2017/168639
PCT Pub. Date: Oct. 5, 2017

(65) Prior Publication Data
US 2019/0029080 A1  Jan. 24, 2019

(51) Int. Cl.
*H05B 6/10* (2006.01)
*H05B 6/44* (2006.01)

(52) U.S. Cl.
CPC ............... *H05B 6/103* (2013.01); *H05B 6/44* (2013.01); *Y02P 10/25* (2015.11)

(58) Field of Classification Search
CPC .......... H05B 6/362; H05B 6/365; H05B 6/42; H05B 6/103; H05B 6/104; H05B 6/44; Y02P 10/253

(Continued)

(56) References Cited

U.S. PATENT DOCUMENTS

| | | | | |
|---|---|---|---|---|
| 4,795,872 A | * | 1/1989 | Hagisawa | ................ C21D 9/60 219/645 |
| 5,397,877 A | | 3/1995 | Couffet et al. | |

(Continued)

FOREIGN PATENT DOCUMENTS

| | | |
|---|---|---|
| EP | 2538749 A1 | 12/2012 |
| JP | 6-36867 A | 2/1994 |

(Continued)

OTHER PUBLICATIONS

Notification of Transmittal of Translation of the International Preliminary Report on Patentability, International Preliminary Report on Patentability, English Translation of Written Opinion of the International Searching Authority dated Oct. 11, 2018, issued in PCT/JP2016/060426 (Forms PCT/IB/338, PCT/IB/373 and PCT/ISA/237).

(Continued)

*Primary Examiner* — Quang T Van
(74) *Attorney, Agent, or Firm* — Birch, Stewart, Kolasch & Birch, LLP

(57) ABSTRACT

A first coil 110 and a second coil 120 are faced each other across a conductor plate S so that the first coil (110) and the second coil (120) become substantially the same in position in a Y-axis direction. The conductor plate S is inductively heated by applying alternating currents at a frequency at which a depth of penetration of the current becomes equal to or less than half a plate thickness of the conductor plate S to the first coil (110) and the second coil (120) in opposite directions.

16 Claims, 13 Drawing Sheets

(58) Field of Classification Search
USPC ....... 219/645, 635, 646, 647, 670, 671, 672, 219/673; 266/90, 104, 129; 118/500, 118/639, 725, 730, 732
See application file for complete search history.

(56) References Cited

U.S. PATENT DOCUMENTS

| | | | |
|---|---|---|---|
| 5,837,976 A | 11/1998 | Loveless et al. | |
| 2002/0148830 A1* | 10/2002 | Ross | H05B 6/365 219/670 |
| 2006/0124633 A1* | 6/2006 | Roehr | H05B 6/365 219/645 |

FOREIGN PATENT DOCUMENTS

| | | |
|---|---|---|
| JP | 6-88194 A | 3/1994 |
| JP | 7-153560 A | 6/1995 |
| JP | 2003-187950 A | 7/2003 |
| JP | 2007-122924 A | 5/2007 |
| JP | 2007-324009 A | 12/2007 |
| JP | 4959651 B2 | 6/2012 |
| KR | 10-0277162 B1 | 1/2001 |

OTHER PUBLICATIONS

Hazumi, Shigejiro, "Characteristics of electric heating and its frequencies", Electro-Heat, Japan Electro-heat Association, 1992, No. 62, pp. 6-7.
International Search Report for PCT/JP2016/060426 (PCT/ISA/210) dated Jun. 21, 2016.
Written Opinion of the International Searching Authority for PCT/JP2016/060426 (PCT/ISA/237) dated Jun. 21, 2016.
Extended European Search Report for corresponding European Application No. 16896858.4, dated Oct. 22, 2019.
Korean Office Action for corresponding Korean Application No. 10-2018-7022568, dated Oct. 21, 2019.

\* cited by examiner

INDUCTION HEATING DEVICE AND INDUCTION HEATING METHOD

TECHNICAL FIELD

The present invention relates to an induction heating device and an induction heating method.

BACKGROUND ART

Conventionally, continuously heating a conductor plate such as a band-shaped steel plate has been performed by using an induction heating device. The induction heating device is to apply alternating magnetic fields generated from coils to the conductor plate, generate, in this conductor plate, Joule heat based on eddy currents induced in this conductor plate by electromagnetic induction, and heat this conductor plate by this Joule heat.

Examples of such an induction heating device include a LF (Longitudinal Flux)-type induction heating device and a TF (Transverse Flux)-type induction heating device.

FIG. 12 is a view illustrating a constitution of the LF-type induction heating device. Concretely, FIG. 12 is a view illustrating the state of a LF-type induction heating device 1200 viewed from above. Incidentally, X-Y-Z coordinates in each drawing indicate the directional relationship in each drawing. The origins of X-Y-Z coordinates in the respective drawings are the same (the origin of X-Y-Z coordinates is not limited to the position illustrated in each drawing). Further, a band-shaped conductor plate S to be heated is to be passed in a positive direction of the Y axis (in an outline arrow direction in FIG. 12). The above is applied also to the other drawings.

The LF-type induction heating device 1200 illustrated in FIG. 12 includes a solenoid coil 1210. The solenoid coil 1210 is wound in a direction substantially vertical to the passing direction of the conductor plate S so as to surround the band-shaped conductor plate S. Thus, in the LF-type induction heating device 1200, a path of current to flow through the solenoid coil 1210 and the conductor plate S to be passed are interlinked. Incidentally, one example of the direction of the current flowing through the solenoid coil 1210 is the direction of an arrow line illustrated in the solenoid coil 1210 in FIG. 12. An alternating current is applied to the solenoid coil 1210 to apply an alternating magnetic field substantially parallel to the longitudinal direction of the conductor plate S (such a magnetic field is called a longitudinal magnetic field (LF)). As such a LF-type induction heating device, there is a technique described in Patent Literature 1.

As above, in the LF-type induction heating device, the conductor plate is passed through the inside of the solenoid coil in an interlinked state. For this reason, in the case where the conductor plate is inside the solenoid coil, it is impossible to retract the solenoid coil temporarily. For example, when the conductor plate fractures on the upstream side from the induction heating device, the conductor plate is passed through the induction heating device while fluttering. In this case, the conductor plate comes into contact with the coil, and the coil and the like are liable to be damaged. Further, the coil itself often becomes an obstacle to a restoration work when the conductor plate is passed through a line when the operation resumes.

Thus, Patent Literature 2 discloses a technique in which a part region of a coil is set as a door portion and the door portion is designed to be able to open and close with respect to a coil main body. Using the technique described in Patent Literature 2 enables retraction even in the LF-type induction heating device by horizontally moving the coil after the door portion is opened with respect to the coil main body.

FIG. 13 is a view illustrating a constitution of the TF-type induction heating device. Concretely, FIG. 13 is a view illustrating the state of a TF-type induction heating device 1300 viewed from above.

As illustrated in FIG. 13, in the TF-type induction heating device 1300, two coils 1310, 1320 are arranged above and below a conductor plate S across a plate surface of the band-shaped conductor plate S. The two coils 1310, 1320 are turned in a direction substantially parallel to the plate surface of the conductor plate S. Thus, in the TF-type induction heating device 1300, paths of currents to flow through the two coils 1310, 1320 and the conductor plate S to be passed do not interlink. Incidentally, one example of the direction of the current flowing through the coils 1310, 1320 is the direction of an arrow line illustrated in the coils 1310, 1320 in FIG. 13. Alternating currents, which are the same in direction, are applied to the two coils 1310, 1320 and alternating magnetic fields are applied substantially vertically to the plate surface of the conductor plate S (such a magnetic field is called a transverse magnetic field (TF)). At this time, the alternating magnetic fields, which are the same in direction, are generated from the coils 1310, 1320. As these transverse magnetic fields are larger, the conductor plate S can be heated to a higher temperature.

Further, Patent Literature 3 discloses a technique in which two single-turn induction heating coils arranged across a conductor plate are shifted in a passing direction of the conductor plate by a coil width. The two single-turn induction heating coils described in Patent Literature 3 play the same role as that of the coils 1310, 1320. However, as described previously, the alternating currents to be applied to the coils 1310, 1320 are the same in direction. On the other hand, alternating currents to be applied to the two single-turn induction heating coils described in Patent Literature 3 are opposite in direction. The two single-turn induction heating coils are shifted in the passing direction of the conductor plate by a coil width, and thereby an offset of eddy currents generated in the conductor plate due to transverse magnetic fields from the two single-turn induction heating coils is suppressed.

Further, in the TF-type induction heating device, the eddy current concentrates in width-direction end portions of the conductor plate S (in the following explanation, these portions are referred to as edge portions as necessary). Therefore, it is general that these edge portions are overheated. Thus, in the TF-type induction heating device, as illustrated in FIG. 13, at positions facing the both edge portions of the conductor plate S, which are between the coil 1310 and the conductor plate S and between the coil 1320 and the conductor plate S, conductor plates 1330 to 1360 are arranged (see Patent Literature 4).

Further, Patent Literature 5 discloses a technique in which not a conductor plate but coils are arranged. Primary coils are arranged above and below a conductor plate across the conductor plate. The primary coils are heating coils and play the same role as that of the coils 1310, 1320. A plurality of secondary coils are provided between the conductor plate and the primary coil. The plural secondary coils play a role of weakening, out of primary magnetic fluxes generated from the primary coils, the primary magnetic fluxes in the vicinity of edge portions of the conductor plate and reducing eddy currents themselves flowing through the conductor plate. The plural secondary coils are designed to be movable along the plate surface direction of the conductor plate.

CITATION LIST

Patent Literature

Patent Literature 1: Japanese Laid-open Patent Publication No. 07-153560
Patent Literature 2: Japanese Laid-open Patent Publication No. 06-88194
Patent Literature 3: Japanese Laid-open Patent Publication No. 2007-324009
Patent Literature 4: Japanese Patent No. 4959651
Patent Literature 5: Japanese Laid-open Patent Publication No. 2007-122924

Non Patent Literature

Non Patent Literature 1: HAZUMI, SHIGEJIRO, "Characteristics of electric heating and its frequencies," Electro-Heat, Japan Electro-heat Association, 1992, No. 62, p. 6-7

SUMMARY OF INVENTION

Technical Problem

However, in the technique described in Patent Literature 2, a work burden for maintenance is large. For example, in the case where the door portion and the coil main body are not in contact with each other uniformly, the current density in a contact portion between the door portion and the coil main body increases, or discharge occurs between the door portion and the coil main body. In this case, interruption of the operation is liable to occur, and the door portion and the coil main body are liable to melt partially. Thus, in order to stabilize the contact state between the door portion and the coil main body, the frequency of maintenance increases to disturb the operation. Further, when the induction heating device described in Patent Literature 2 is applied to a plating line, for example, steam from a plating bath is liable to stay on the contact portion between the door portion and the coil main body. When the steam is cooled in this state, metal composing the plating bath attaches to the contact portion between the door portion and the coil main body to cause discharge trouble in some cases. Thus, a maintenance work for removing such metal is required.

In the meantime, in the techniques described in Patent Literatures 3 to 5, in order to prevent overheating of the edge portions, it is necessary to add members different from the heating coils (the conductor plate and the secondary coils). For this reason, the structure of the induction heating device becomes complicated. Further, in the technique described in Patent Literature 5, it is necessary to move the plural secondary coils according to the plate width of the conductor plate to be heated. Accordingly, it is general to add a further complex mechanism in order to move the plural secondary coils.

The present invention has been made in consideration of the above problems, and an object thereof is to provide an induction heating device that achieves both things, which are to uniformize a temperature distribution in a width direction of a conductor plate as much as possible and to retract coils temporarily, without adding a special constitution.

Solution to Problem

An induction heating device according to the present invention is an induction heating device that inductively heats a passing conductor plate, the induction heating device including: a first coil that generates a magnetic field in a plate thickness direction of the conductor plate by an alternating current flowing therethrough; and a second coil that generates a magnetic field in the plate thickness direction of the conductor plate by an alternating current flowing therethrough, in which the first coil and the second coil are positioned to sandwich the conductor plate therebetween, the first coil and the second coil are substantially the same in position in a passing direction of the conductor plate, magnetic fields that are opposite to each other in direction are generated in the plate thickness direction of the conductor plate from the first coil and the second coil by the alternating currents, eddy currents are generated inside the conductor plate by the magnetic fields that are opposite in direction, and the conductor plate is inductively heated by the eddy currents.

An induction heating method according to the present invention is an induction heating method to, by using an induction heating device including: a first coil that generates a magnetic field in a plate thickness direction of a conductor plate by an alternating current flowing therethrough; and a second coil that generates a magnetic field in the plate thickness direction of the conductor plate by an alternating current flowing therethrough, in which the first coil and the second coil are positioned to sandwich the conductor plate therebetween, and the first coil and the second coil are substantially the same in position in a passing direction of the conductor plate, inductively heat the passing conductor plate, the method including: generating magnetic fields that are opposite to each other in direction in the plate thickness direction of the conductor plate from the first coil and the second coil by the alternating currents; generating eddy currents inside the conductor plate by the magnetic fields opposite in direction; and inductively heating the conductor plate by the eddy currents.

Advantageous Effects of Invention

According to the present invention, it is possible to provide an induction heating device that achieves both things, which are to uniformize a temperature distribution in a width direction of a conductor plate as much as possible and to retract coils temporarily, without adding a special constitution.

DESCRIPTION OF EMBODIMENTS

Hereinafter, with reference to the drawings, there will be explained one embodiment of the present invention. Incidentally, in each drawing, for convenience of explanation and representation, only portions necessary for explanation will be illustrated in a simplified manner as necessary.

Figure 1:
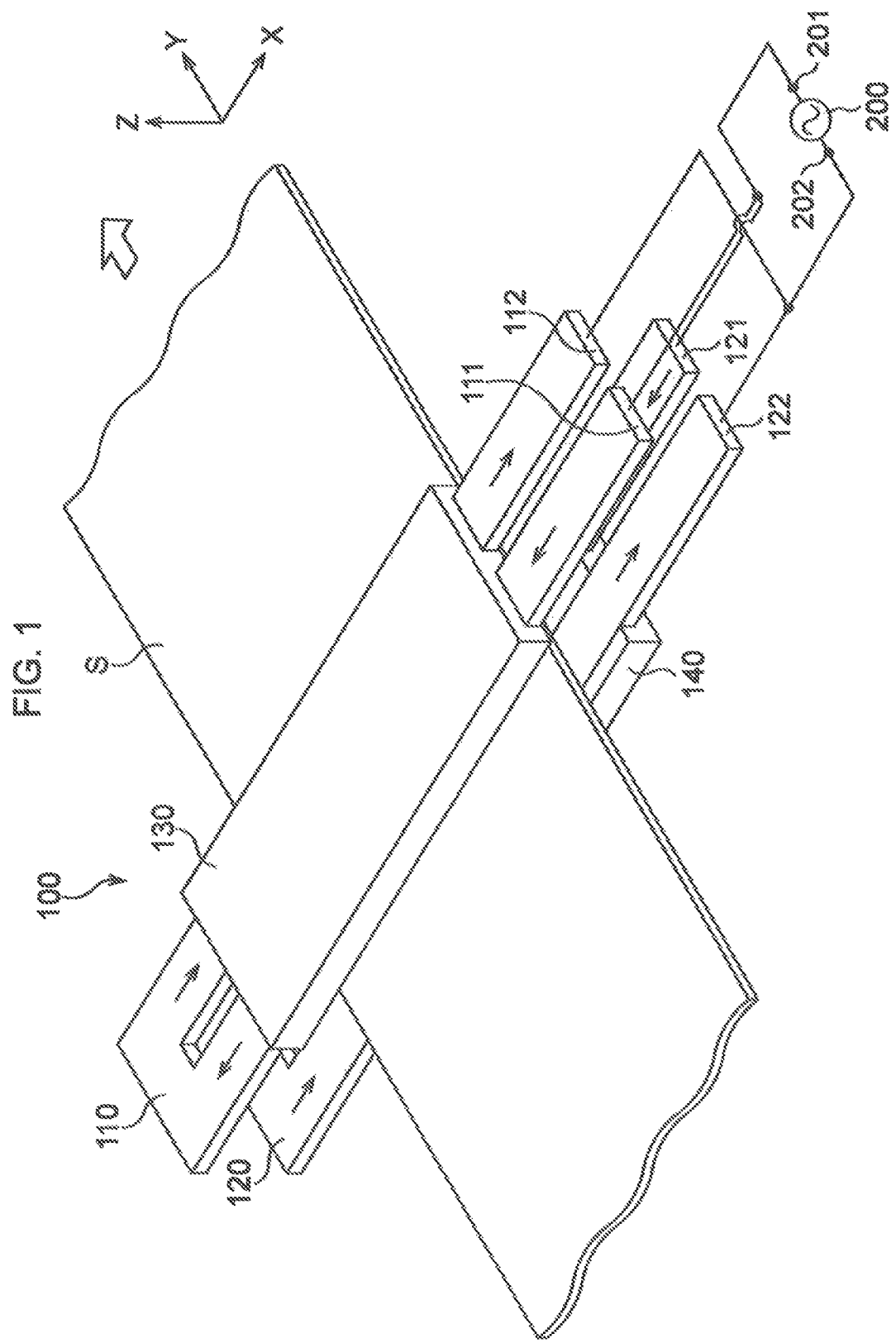
FIG. 1 is a view illustrating one example of a constitution of an induction heating system.

FIG. 1 is a view illustrating one example of a constitution of an induction heating system. Concretely, FIG. 1 is a view illustrating the state of an induction heating device 100 viewed from above. Here, in order to describe the induction heating device 100 in this embodiment distinctively from the LF-type induction heating device and the TF-induction heating device, the induction heating device 100 is referred to as an UF (Ulterior Flux)-type induction heating device as necessary. As will be described later, in the induction heating device 100 in this embodiment, in a region without a conductor plate S between a first coil 110 and a second coil 120, magnetic fields are generated by alternating currents, but the alternating currents are applied so that the mutual magnetic fields are offset to be unseen. Therefore, the type of the induction heating device 100 in this embodiment is referred to as an UF type.

The conductor plate S is a steel plate, for example. However, the conductor plate S is not limited to the steel plate. It is possible to set conductor plates such as a non-magnetic metal plate and a ferromagnetic metal plate to a heating target. Plating may be applied to a surface of the metal plate, and a plurality of metal plates may be laminated. Further, the thickness of the conductor plate S is not limited in particular. It is possible to set a conductor sheet having a thickness of 1 [mm] or less, for example, (thin sheet) to a heating target. Incidentally, the direction of the Y axis in FIG. 1 is not limited in particular, and may be a direction horizontal to the ground, or a direction vertical to the ground, for example.

In FIG. 1, the induction heating system includes the UF-type induction heating device 100 and an alternating-current power supply 200.

The UF-type induction heating device 100 includes the first coil 110, the second coil 120, a first core 130, and a second core 140. Further, the alternating-current power supply 200 is electrically connected to the first coil 110 and the second coil 120.

The first coil 110 and the second coil 120 are coils that are the same in material, shape, and size. The first coil 110 and the second coil 120 each are formed of a metal such as copper, for example.

The first coil 110 is a coil turned in a direction substantially parallel to the plate surface of the conductor plate S. The first coil 110 is arranged so as to have a surface that is made of turned portions thereof (what is called a coil surface thereof) substantially face one surface (front surface) of the two plate surfaces of the conductor plate S at such a distance as not to be in contact with the conductor plate S.

The second coil 120 is also a coil turned in a direction substantially parallel to the plate surface of the conductor plate S similarly to the first coil 110. The second coil 120 is arranged so as to have a surface that is made of turned portions thereof (what is called a coil surface thereof) substantially face the other surface (rear surface) of the two plate surfaces of the conductor plate S at such a distance as not to be in contact with the conductor plate S. Further, upper end surfaces and lower end surfaces of the first coil 110 and the second coil 120 when viewed along a passing direction of the conductor plate S (Y-axis direction in the example illustrated in FIG. 1) are flat surfaces. Further, these surfaces are substantially parallel to the plate surface of the conductor plate S.

Figure 13:
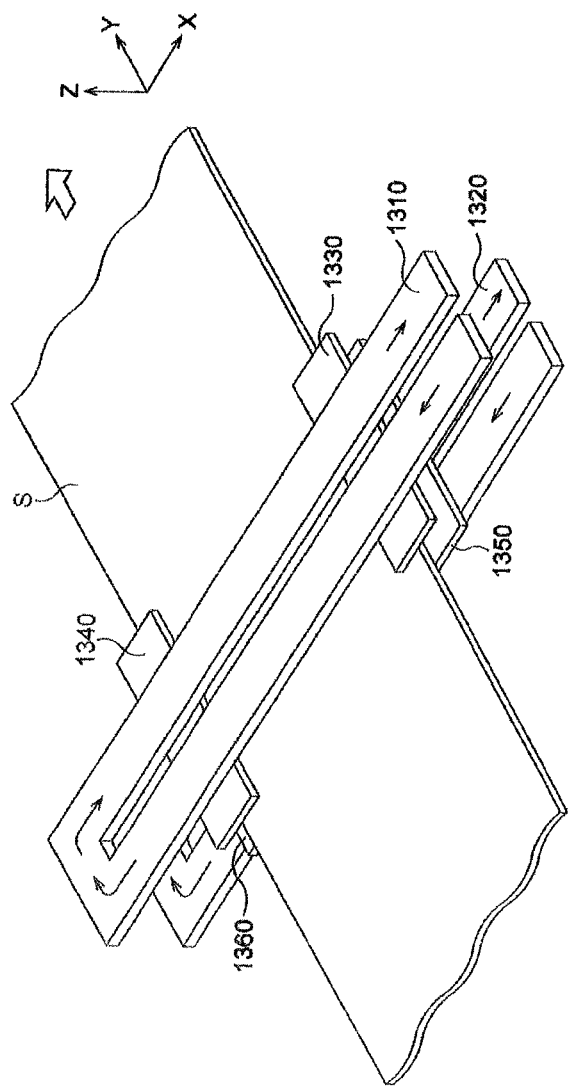
FIG. 13 is a view illustrating a constitution of a TF-type induction heating device.

Further, the first coil 110 and the second coil 120 are arranged at the positions where the first coil 110 and the second coil 120 substantially face each other across the conductor plate S. That is, the positions of the first coil 110 and the second coil 120 in the Y-axis direction (passing direction of the conductor plate S) are substantially the same. The example illustrated in FIG. 1 is set that the distance between the first coil 110 and the conductor plate S and the distance between the second coil 120 and the conductor plate S are the same. Further, in the example illustrated in FIG. 1, the number of turns of the first coil 110 and the number of turns of the second coil 120 are both one [time]. As above, in the example illustrated in FIG. 1, the positions of the first coil 110 other than the position of the Z-axis direction and the positions of the second coil 120 other than the position of the Z-axis direction are substantially the same. The first coils 110, the second coil 120 can be fabricated by the same constitution as that of the coils 1310, 1320 illustrated in FIG. 13.

Figure 2:
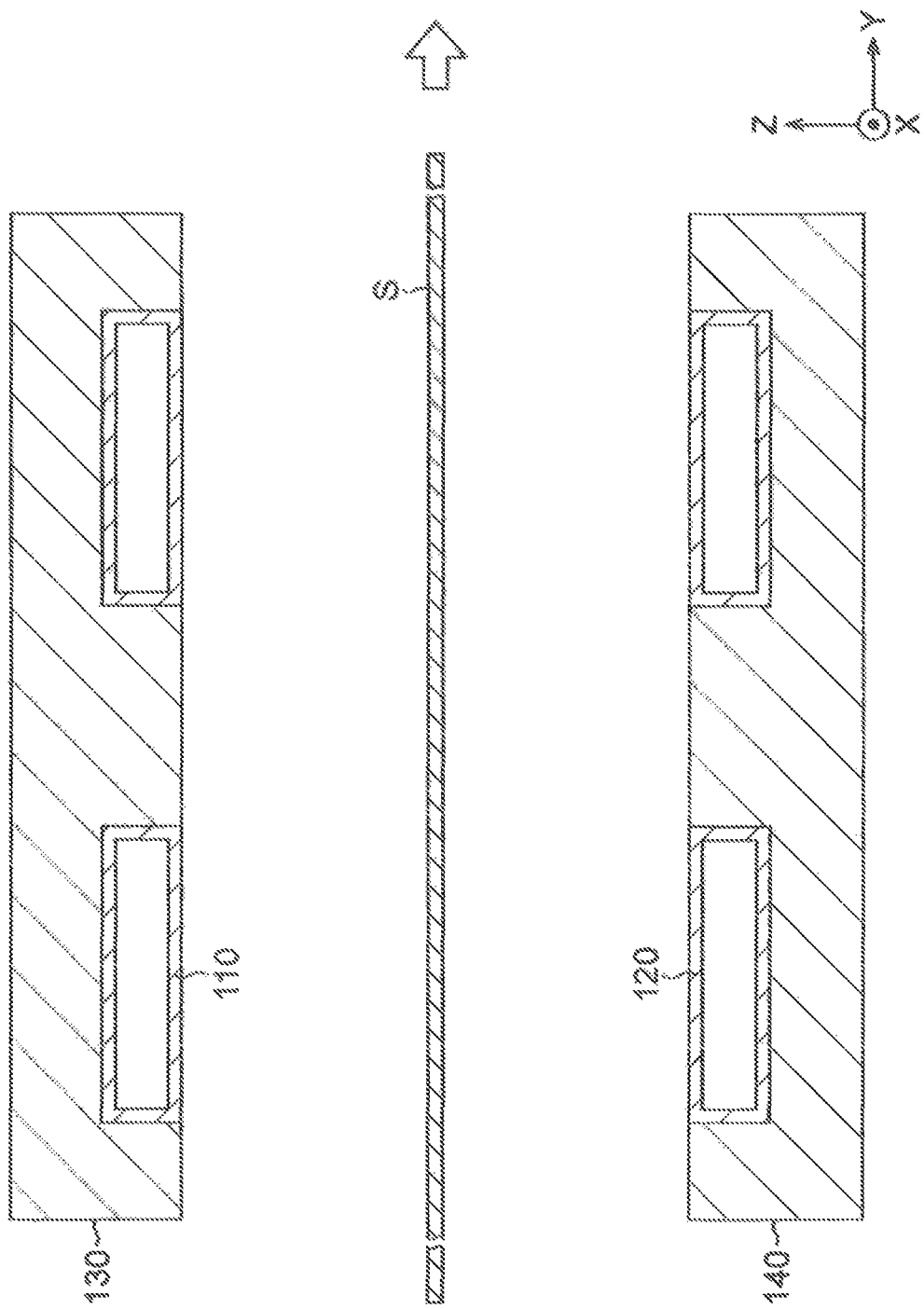
FIG. 2 is a view illustrating one example of a Y-Z cross section of an induction heating device in an embodiment.

FIG. 2 is a view illustrating one example of a Y-Z cross section of the UF-type induction heating device 100. The Y-Z cross section is a cross section in the case of cutting the UF-type induction heating device 100 at the middle position in a width direction (X-axis direction) of the conductor plate S along a surface determined by the passing direction of the conductor plate S (Y-axis direction) and a plate thickness direction (Z-axis direction) (Y-Z plane).

The first core 130 and the second core 140 are cores that are the same in material, shape, and size. The first core 130 and the second core 140 are each formed of a soft magnetic material such as ferrite, for example. The first core 130 is arranged at the position to be a magnetic path of magnetic fluxes generated from the first coil 110. The second core 140 is arranged at the position to be a magnetic path of magnetic fluxes generated from the second coil 120.

As illustrated in FIG. 1 and FIG. 2, in this embodiment, the first core 130 has a shape obtained by forming recessed portions in a rectangular parallelepiped shape according to shapes of regions extending in the width direction (X-axis direction) of the first coil 110. In this embodiment, as illustrated in FIG. 1 and FIG. 2, the recessed portions of the first core 130 are formed so that in the case where the first coil 110 is arranged in the recessed portions, the surface of the first coil 110 facing the conductor plate S and the surface of the first core 130 facing the conductor plate S become substantially flush with each other.

In the same manner, the second core 140 has a shape obtained by forming recessed portions in a rectangular parallelepiped shape according to shapes of regions extending in the width direction (X-axis direction) of the second coil 120. Further, the recessed portions of the second core 140 are formed so that in the case where the second coil 120 is arranged in the recessed portions, the surface of the second coil 120 facing the conductor plate S and the surface of the second core 140 facing the conductor plate S become substantially flush with each other.

Incidentally, as long as magnetic fields can be applied to the conductor plate S so that the magnetic field between the first core 130 and the conductor plate S and the magnetic field between the second core 140 and the conductor plate S become opposite to each other in direction, the shapes of the first coil 110 and the second coil 120 are not limited to the shapes illustrated in FIG. 1. For example, the surface of the first coil 110 facing the conductor plate S and the surface of the first core 130 facing the conductor plate S do not need to be substantially flush with each other. The same is true of the second coil 120 and the second core 140.

Further, an insulating treatment is performed between the first coil 110 and the first core 130. An insulating treatment is performed also between the second coil 120 and the second core 140.

Although in FIG. 1, illustration is omitted for convenience of representation, in this embodiment, the first coil 110 and the second coil 120 each have a hollow shape, as illustrated in FIG. 2. Concretely, in the example illustrated in FIG. 2, the first coil 110 and the second coil 120 each have a hollow rectangle in a cross section vertical to the direction in which the alternating current flows. A cooling water is made to flow through the hollow portions. This cooling water water-cools the first coil 110 and the second coil 120, thereby making it possible to suppress increases in heat generation of the first coil 110 and the second coil 120.

Here, the conductor plate S is passed so as to have an entire region thereof in the width direction (X-axis direction) positioned between the first core 130 and the second core 140. That is, the conductor plate S is designed to pass through between the first coil 110 and the second coil 120 in a state where its end portions (edge portions) in the width direction are positioned on the inner side relative to width-direction (X-axis-direction) end portions of the first core 130 and the second core 140. Lengths in the width direction (X-axis direction) of the UF-type induction heating device 100 (the first coil 110, the second coil 120, the first core 130, and the second core 140) are determined beforehand so as to achieve the above.

Further, as illustrated in FIG. 1, in this embodiment, one end portion 111 of the first coil 110 is electrically connected to one terminal 201 of two output terminals of the alternating-current power supply 200. Further, the other end portion 112 of the first coil 110 is electrically connected to the other terminal 202 of the two output terminals of the alternating-current power supply 200.

Further, of two end portions of the second coil 120, one end portion 121 positioned at a position facing the other end portion 112 of the first coil 110 each other in the Z-axis direction is electrically connected to the one terminal 201 of the two output terminals of the alternating-current power supply 200. Further, of the two end portions of the second coil 120, the other end portion 122 positioned at a position facing the one end portion 111 of the first coil 110 each other in the Z-axis direction is electrically connected to the other terminal 202 of the two output terminals of the alternating-current power supply 200.

As above, in this embodiment, the first coil 110 and the second coil 120 are connected in parallel to the alternating-current power supply 200 so that turning directions of the first coil 110 and the second coil 120 (when viewed from the alternating-current power supply 200) become opposite to each other.

Accordingly, when the alternating currents are applied from the alternating-current power supply 200, as illustrated in FIG. 1, the directions (when viewed from the same viewpoint at the same time) of the alternating currents flowing through the mutually facing regions of the first coil 110 and the second coil 120 become opposite to each other (see arrow lines illustrated in the first coil 110 and the second coil 120 in FIG. 1).

The arrow lines illustrated in the first coil 110 and the second coil 120 in FIG. 1 indicate that in the case of the UF-type induction heating device 100 being viewed from above, the direction of the alternating current flowing through the first coil 110 is clockwise (right-handed) and the direction of the alternating current flowing through the second coil 120 is counterclockwise (left-handed).

Here, the alternating currents applied to the first coil 110 and the second coil 120 from the alternating-current power supply 200 are different only in direction (when viewed from the same viewpoint at the same time), and are the same in magnitude and frequency (at the same time).

Incidentally, a waveform of the alternating current is a sine wave, for example. However, the waveform of the alternating current is not limited to the sine wave, and can be set to the same waveform as that which can be used in a general induction heating device.

Incidentally, in the following explanation, "the directions (at the same time) of the alternating currents flowing through the mutually facing regions of the first coil 110 and the second coil 120" are referred to as "the directions of the alternating currents of the first coil 110 and the second coil 120" as necessary.

Figure 3:
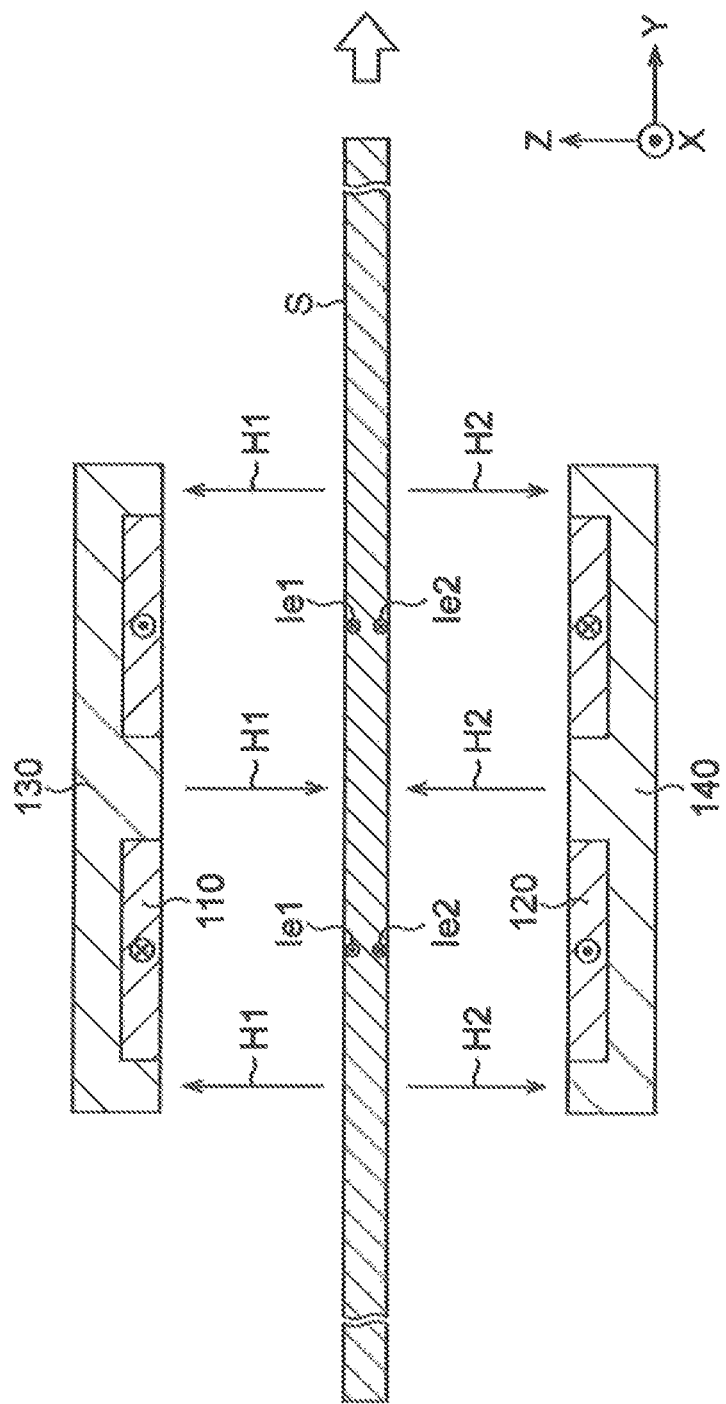
FIG. 3 is a view conceptually illustrating one example of directions of magnetic fields generated by alternating currents flowing through a first coil and a second coil.

FIG. 3 is a view conceptually illustrating one example of the directions of magnetic fields generated by the alternating currents flowing through the first coil 110 and the second coil 120.

Incidentally, also in FIG. 3, illustrations of the hollow portions of the first coil 110 and the second coil 120 are omitted similarly to FIG. 1. Further, in FIG. 3, the directions of magnetic fields in the case where the alternating currents flow in the directions of the arrow lines illustrated in the first coil 110 and the second coil 120 in FIG. 1 will be described as an example. Further, for convenience of representation, in FIG. 3, the conductor plate S is illustrated with a thicker thickness as compared to the other drawings.

The alternating current flows through the first coil 110, and thereby a magnetic field H1 in a direction substantially vertical to the plate surface of the conductor plate S (namely, in the plate thickness direction of the conductor plate S) is generated in the region between the first core 130 and the conductor plate S. Similarly, the alternating current flows through the second coil 120, and thereby a magnetic field H2 in a direction substantially vertical to the plate surface of the conductor plate S (namely, in the plate thickness direction of the conductor plate S) is generated in the region between the second core 140 and the conductor plate S. In this embodiment, the directions of the alternating currents flowing through the first coil 110 and the second coil 120 are set opposite to each other, and thus as illustrated in FIG. 3, the directions of the magnetic fields H1, H2 in the mutually facing regions of the first core 130 and the second core 140 become opposite to each other. At this time, an eddy current Ie1 and an eddy current Ie2 are induced in directions opposite to each other to flow through one surface (upper surface) of the conductor plate S and the other surface (lower surface) thereof respectively. Details of the eddy currents Ie1, Ie2 will be described later with reference to FIG. 4, FIG. 5A, and FIG. 5B.

Also in the UF-type induction heating device 100 in this embodiment, paths of the currents flowing through the first coil 110 and the second coil 120 and the conductor plate S to be passed are not interlinked similarly to the TF-type induction heating device explained in BACKGROUND ART.

However, in the TF-type induction heating device, the directions of the currents flowing through the coils 1310, 1320 are set the same. Further, in the technique described in Patent Literature 3, the two single-turn induction heating coils are shifted in the passing direction of the conductor plate by a coil width in order to prevent an offset of eddy currents generated in the conductor plate due to the transverse magnetic fields from the two single-turn induction heating coils.

In contract to this, in this embodiment, as described previously, the directions of the alternating currents flowing through the first coil 110 and the second coil 120 are set opposite to each other, and at the same time, the positions of the first coil 110 and the second coil 120 in the Y-axis direction (passing direction of the conductor plate S) are set substantially the same. The following findings found out by the present inventors for the first time contribute to such devising.

First, when alternating currents, which are the same in magnitude, are applied to the completely same two coils in the opposite directions and these two coils are brought close to each other, magnetic fields generated by the mutual coils are canceled in most places because the magnetic fields are the same in magnitude and are opposite in direction.

In the TF-type induction heating device, the magnetic fields penetrating the conductor plate make eddy currents flow through the conductor plate, and these eddy currents heat the conductor plate. At this time, in the TF-type induction heating device, the directions of the currents to be applied to the two coils are set the same. The conductor plate is arranged between the two coils and the currents at a frequency employed in the TF-type induction heating device are applied to these two coils in the opposite directions, and thereby magnetic fields generated by the coils are offset even in the conductor plate.

Accordingly, the eddy currents are not generated in the conductor plate and the conductor plate is not inductively heated. In the TF-type induction heating device, the magnetic fields generated by the two coils are increased in magnitude, thereby making it possible to heat the conductor plate to high temperature. Accordingly, applying the alternating currents to these coils so as to cancel the magnetic fields generated by these two coils leads to a reduction in effects of the TF-type induction heating device.

In contrast to this, in the technique described in Patent Literature 3, the directions of the alternating currents applied to the two single-turn induction heating coils are opposite. However, in the technique described in Patent Literature 3, the two single-turn induction heating coils are shifted in the passing direction of the conductor plate by a coil width. In Patent Literature 3, such a constitution is employed in order to prevent the eddy currents generated in the conductor plate by the magnetic fields from the two single-turn induction heating coils from offsetting. Accordingly, the technique described in Patent Literature 3 is based on the idea that the eddy currents generated in the conductor plate by the magnetic fields from the two single-turn induction heating coils are offset unless the single-turn induction heating coils are shifted in the passing direction of the conductor plate. Then, like the technique described in Patent Literature 3, in the constitution in which the two single-turn induction heating coils are shifted in the passing direction of the conductor plate by a coil width, overheating of the edge portions occurs unless the techniques described in Patent Literatures 4, 5 are applied. Further, the two single-turn induction heating coils assist the LF-type induction heating device, and fail to inductively heat the conductor plate up to a desired temperature by themselves.

In contrast to this, the present inventors found out that the conductor plate S is arranged between the first coil 110 and the second coil 120 in a state where the positions of the first coil 110 and the second coil 120 in the Y-axis direction (passing direction of the conductor plate S) are made substantially the same, as long as the frequency of the alternating currents to be applied to the first coil 110 and the second coil 120 is adjusted even though the directions of the alternating currents flowing through the first coil 110 and the second coil 120 are made opposite to each other, the inside of the conductor plate S is brought into a state where the magnetic fields H1, H2 generated by the alternating currents flowing through the first coil 110 and the second coil 120 are not offset, and the eddy currents based on the magnetic fields H1, H2 are generated inside the conductor plate S.

Figure 4:
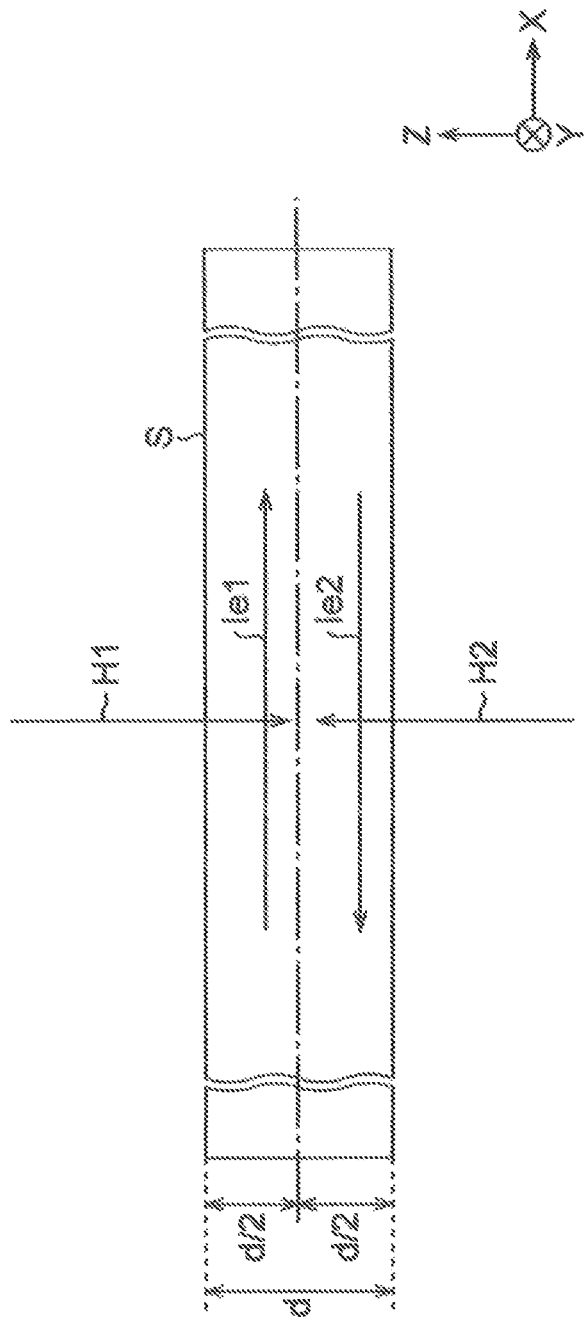
FIG. 4 is a view conceptually illustrating one example of the state where the magnetic fields generated by the alternating currents flowing through the first coil and the second coil penetrate into a conductor plate.

FIG. 4 is a view conceptually illustrating one example of the state where the magnetic fields H1, H2 generated by the alternating currents flowing through the first coil 110 and the second coil 120 penetrate into the conductor plate S.

A distribution of currents generated in the conductor plate by electromagnetic induction has a property in which the current leans toward the surface by a skin effect, and this tendency is increased as the frequency is higher. As described in Non-Patent Literature 1 or the like, a depth of penetration of the current in the conductor plate (depth from the surface of the conductor plate to the point where the current density decreases to 1/e (=0.3680) of the surface) δ [m] is expressed by (1) Expression below.

[Mathematical expression 1]

$$\delta = \sqrt{\frac{2\rho}{\omega\mu}} = 503\sqrt{\frac{\rho}{\mu_s f}} \quad (1)$$

In (1) Expression, ρ is resistivity of the conductor [Ω·m], ω is an angular frequency [rad/s] (=2πf), μ is magnetic permeability of the conductor [H/m], $\mu_s$ is relative permeability of the conductor [−], and f is a frequency f [Hz]. The values of the magnetic permeability μ (relative permeability $\mu_s$) and the resistivity ρ are values of the conductor plate S at a target heating temperature mainly.

The present inventors found out that based on (1) Expression above, the frequency of the alternating currents to be applied to the first coil 110 and the second coil 120 (f in (1) Expression) is adjusted, and thereby the magnetic fields generated by the alternating currents flowing through the first coil 110 and the second coil 120 are not offset inside the conductor plate S even when in a state where the positions of the first coil 110 and the second coil 120 in the Y-axis direction (passing direction of the conductor plate S) are made substantially the same, the conductor plate S is arranged between the first coil 110 and the second coil 120 and the directions of the alternating currents flowing through the first coil 110 and the second coil 120 are made opposite to each other.

As a preferred range of such a frequency of the alternating currents flowing through the first coil 110 and the second coil 120, the present inventors found out the following range. That is, the present inventors found out that it is preferred to determine the frequency of the alternating currents to be applied to the first coil 110 and the second coil 120 (f in (1) Expression) in a range satisfying (2) Expression below.

$$\delta \leq d/2 \qquad (2)$$

In (2) Expression, d is a plate thickness [m] of the conductor plate S. As expressed in (2) Expression, as long as the frequency of the alternating currents to be applied to the first coil 110 and the second coil 120 is determined so that the depth of penetration δ of the current in the conductor plate S becomes equal to or less than ½ times of the plate thickness d [m] of the conductor plate S, a range where the magnetic field H1 generated by the alternating current flowing through the first coil 110 penetrates into the conductor plate S and a range where the magnetic field H2 generated by the alternating current flowing through the second coil 120 penetrates into the conductor plate S are separated as illustrated in FIG. 4. Accordingly, in a region into which the magnetic field H1 penetrates and a region into which the magnetic field H2 penetrates, the eddy currents Ie1, Ie2, which are opposite to each other in direction, appear separately. The eddy current Ie1 can heat one surface side of the conductor plate S, and the eddy current Ie2 can heat the other surface side of the conductor plate S. Incidentally, the directions of the eddy currents Ie1, Ie2 illustrated in FIG. 4 are one example, and as illustrated in FIG. 5B that will be described later, there are also a region where the direction of the eddy current Ie1 is opposite to the direction illustrated in FIG. 4 and a region where the direction of the eddy current Ie2 is opposite to the direction illustrated in FIG. 4.

In the meantime, the upper limit value of the frequency of the alternating currents to be applied to the first coil 110 and the second coil 120 is not limited in particular, and is set appropriately as usage. For example, in the case where the entire inside of the conductor plate S is desired to be inductively heated as uniformly as possible, a frequency as low as possible only needs to be selected within the range satisfying (1) Expression. In the meantime, in the case where only the region close to the surface of the conductor plate S is desired to be heated, a high frequency only needs to be selected according to the thickness from the surface of the region desired to be heated (a high frequency only needs to be selected as the range in the thickness direction from the surface is smaller as a range desired to be heated).

Figure 5A:
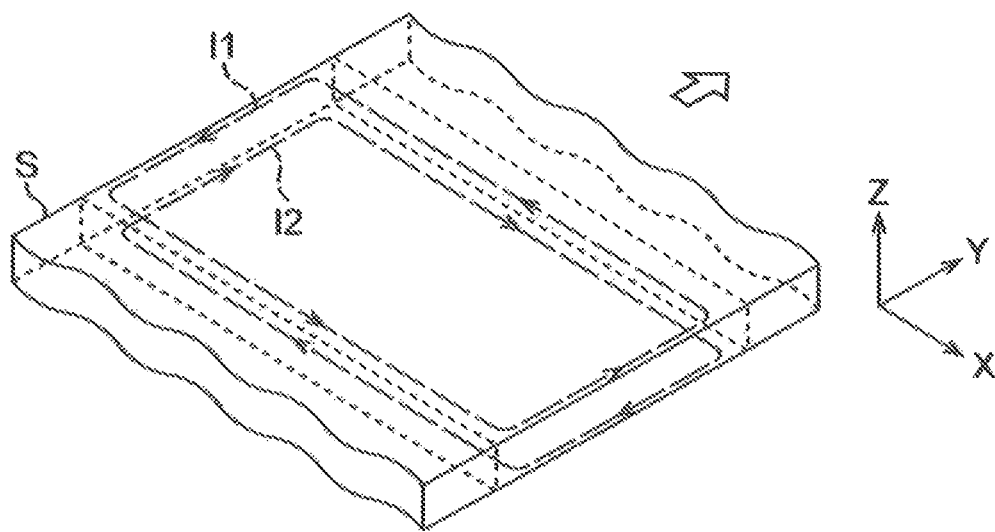
FIG. 5A is a view conceptually illustrating one example of eddy currents assuming that an eddy current based on the magnetic field generated by the first coil and an eddy current based on the magnetic field generated by the second coil exist independently.
Figure 5B:
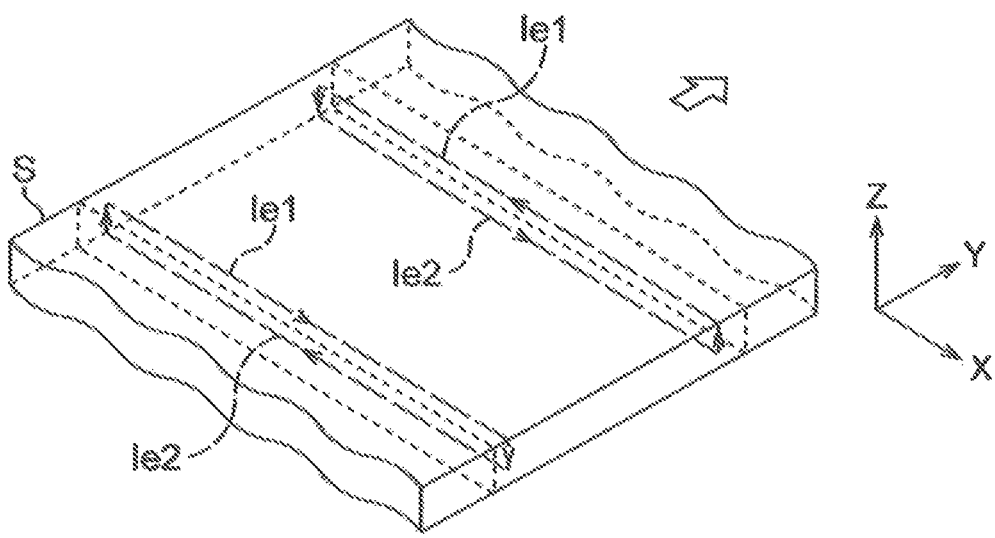
FIG. 5B is a view conceptually illustrating one example of eddy currents generated inside the conductor plate.

FIG. 5A and FIG. 5B are views each explaining one example of the eddy currents generated inside the conductor plate S. Concretely, FIG. 5A is a view conceptually illustrating one example of the eddy currents assuming that the eddy current based on the magnetic field H1 generated by the alternating current flowing through the first coil 110 and the eddy current based on the magnetic field H2 generated by the alternating current flowing through the second coil 120 exist independently. Further, FIG. 5B is a view conceptually illustrating one example of the eddy currents generated inside the conductor plate S. In FIG. 5A and FIG. 5B, there is illustrated only a portion of the conductor plate S near a region (between the first coil 110 and the second coil 120) inside the UF-type induction heating device 100.

Here, in FIG. 5A and FIG. 5B, there are described, as an example, the eddy currents generated in the case where the alternating currents flow through the first coil 110 and the second coil 120 in the directions illustrated in FIG. 1. That is, the direction of the magnetic field H1 generated by the alternating current flowing through the first coil 110 is a negative direction of the Z axis. Further, the direction of the magnetic field H2 generated by the alternating current flowing through the second coil 120 is a positive direction of the Z axis. Further, in FIG. 5A and FIG. 5B, it is set that the alternating current at the frequency f satisfying (1) Expression flows through the first coil 110 and the second coil 120.

That is, an eddy current I1 based on the magnetic field H1 generated by the alternating current flowing through the first coil 110 flows in a direction to cancel the magnetic field H1 (see FIG. 5A). Further, an eddy current I2 based on the magnetic field H2 generated by the alternating current flowing through the second coil 120 flows in a direction to cancel the magnetic field H2 (see FIG. 5A). These eddy currents I1 and I2 are generated independently in response to the magnetic fields H1 and H2 respectively.

However, in FIG. 5A, in regions of the width-direction (X-axis-direction) end portions (edge portions) of the conductor plate S, a conductor (forming the conductor plate S) does not exist at the tips of these end portions (plate thickness portions of these end portions also become the surface). Accordingly, the eddy currents in these regions out of the eddy currents I1, I2 are mixed with each other to be offset, resulting in that the eddy currents do not flow through these regions.

On the other hand, in FIG. 5A, in a region apart from the width-direction (X-axis-direction) end portions (edge portions) of the conductor plate S, the conductor (forming the conductor plate S) exists around the region (the conductor plate S exists continuously in the passing direction (Y-axis direction). Accordingly, the eddy currents in this region out of the eddy currents I1, I2 remain separated and exist without mixing with each other.

From the above, the eddy currents actually generated in the conductor plate out of the eddy currents I1, I2 illustrated in FIG. 5A result in only the eddy currents existing in the region (surface) vertical to the passing direction (Y-axis direction) of the conductor plate S. That is, the eddy currents along the width-direction (X-axis-direction) end portions (edge portions) of the conductor plate S are not generated. As a result, as illustrated in FIG. 5B, in the region (surface) vertical to the passing direction (Y-axis direction) of the conductor plate S, the eddy current Ie1 and the eddy current Ie2 flow in directions opposite to each other through the one surface (upper surface) and the other surface (lower surface) of the conductor plate S respectively. As a result, as illustrated in FIG. 5B, (loops of) the eddy currents Ie1, Ie2 opposite to each other in direction are generated in two regions apart from each other in the passing direction (Y-axis direction) of the conductor plate S, which are the regions (surfaces) inside the conductor plate S vertical to the passing direction (Y-axis direction) of the conductor plate S.

As above, the present inventors obtained the findings that in the case where the alternating currents opposite to each other in direction are applied to the first coil 110 and the second coil 120, even when the magnetic fields (transverse magnetic fields) are generated in the direction vertical to the plate surface of the conductor plate S from the first coil 110 and the second coil 120 similarly to the TF-type induction heating device, the eddy currents Ie1, Ie2 flow through the regions (surfaces) vertical to the passing direction (Y-axis direction) of the conductor plate S similarly to the LF-type induction heating device.

These eddy currents Ie1, Ie2 do not flow through the width-direction (X-axis-direction) end portions (edge portions) of the conductor plate S along the longitudinal direction (Y-axis direction). Accordingly, like the TF-type induction heating device, the edge portions are not overheated. Thus, it is possible to make the temperature distribution in the width direction (X-axis direction) of the conductor plate S substantially uniform. Furthermore, the directions of the eddy currents Ie1, Ie2 flowing through the conductor plate S are opposite to each other. This becomes equivalent to the eddy currents generated in the case where the two LF-type induction heating devices are arranged in the passing direction (Y-axis direction) of the conductor plate S and the directions of currents to be applied to the coils in these two LF-type induction heating devices are made opposite to each other. That is, the single induction heating device makes it possible to generate the eddy currents equivalent to the eddy currents generated in the two LF-type induction heating devices.

In the meantime, in the technique described in Patent Literature 3, the two single-turn induction heating coils are shifted in the passing direction of the conductor plate. As a result, the eddy currents I1, I2 illustrated in FIG. 5A exist with their positions in the passing direction (Y-axis direction) of the conductor plate S varied. That is, in the technique described in Patent Literature 3, such eddy currents Ie1, Ie2 as illustrated in FIG. 5B do not flow, and the eddy currents flow through the width-direction (X-axis-direction) end portions (edge portions) of the conductor plate S along the longitudinal direction (Y-axis direction). Thereby, in the technique described in Patent Literature 3, overheating of the edge portions occurs as described previously.

Further, the first coil 110 and the second coil 120 can be fabricated by the same coils as those in the TF-type induction heating device. Accordingly, similarly to the TF-type induction heating device, for example, only moving the first coil 110 and the second coil 120 makes it possible to retract the UF-type induction heating device 100 temporarily.

As a method of retraction, there are the following methods, for example.

As the first method, there can be cited a method of moving the first coil 110 and the second coil 120 in the horizontal direction until the UF-type induction heating device 100 no longer faces the plate surface of the conductor plate S each other.

Concretely, it is possible to move the first coil 110 and the second coil 120 in the same direction. That is, the first coil 110 and the second coil 120 are moved in the positive direction or the negative direction of the X axis.

Further, it is also possible to move the first coil 110 and the second coil 120 in different directions. That is, the first coil 110 is moved in the negative direction of the X axis, and the second coil 120 is moved in the positive direction of the X axis. Further, the first coil 110 may be moved in the positive direction of the X axis, and the second coil 120 may be moved in the negative direction of the X axis.

Further, by the above first method, only one of the first coil 110 and the second coil 120 may be moved.

As the second method, there can be cited a method of moving the first coil 110 and the second coil 120 in the vertical direction (height direction) up to a position where the UF-type induction heating device 100 is not liable to come into contact with the conductor plate S.

Concretely, the first coil 110 is moved in the positive direction of the Z axis, and the second coil 120 is moved in the negative direction of the Z axis.

Further, by the above second method, only one of the first coil 110 and the second coil 120 may be moved.

As the third method, there is a method of turning the first coil 110 and the second coil 120 about a predetermined position of the side of the first coil 110 and the second coil 120 connected to the alternating-current power supply 200 as a turning axis until the UF-type induction heating device 100 no longer faces the plate surface of the conductor plate S each other. Turning of the first coil 110 and the second coil 120 can be performed in a horizontal plane (X-Y plane in FIG. 1). The direction of the turning axis in the case of performing the turning in a horizontal plane (X-Y plane in FIG. 1) results in the Z-axis direction. Further, the first coil 110 and the second coil 120 may be the same or different in direction of turning in the case of performing the turning in a horizontal plane (X-Y plane in FIG. 1). On the other hand, it is also possible to perform turning of the first coil 110 and the second coil 120 in a vertical plane (X-Z plane in FIG. 1). The direction of the turning axis in the case of performing the turning in a vertical plane (X-Z plane in FIG. 1) results in the Y-axis direction. Further, the direction of turning in the case of performing the tuning in a vertical plane (X-Z plane in FIG. 1) only needs to be a direction in which the first coil 110 and the second coil 120 each separate from the conductor plate S. Further, in the third method, only one of the first coil 110 and the second coil 120 may be turned.

Besides, it is also possible to retract the UF-type induction heating device 100 temporarily by a combined method of at least the two methods out of the previously-described first method to third method.

In the case of temporarily retracting the UF-type induction heating device 100 as above, a control device for moving the UF-type induction heating device 100 is also included in the induction heating system.

Figure 6:
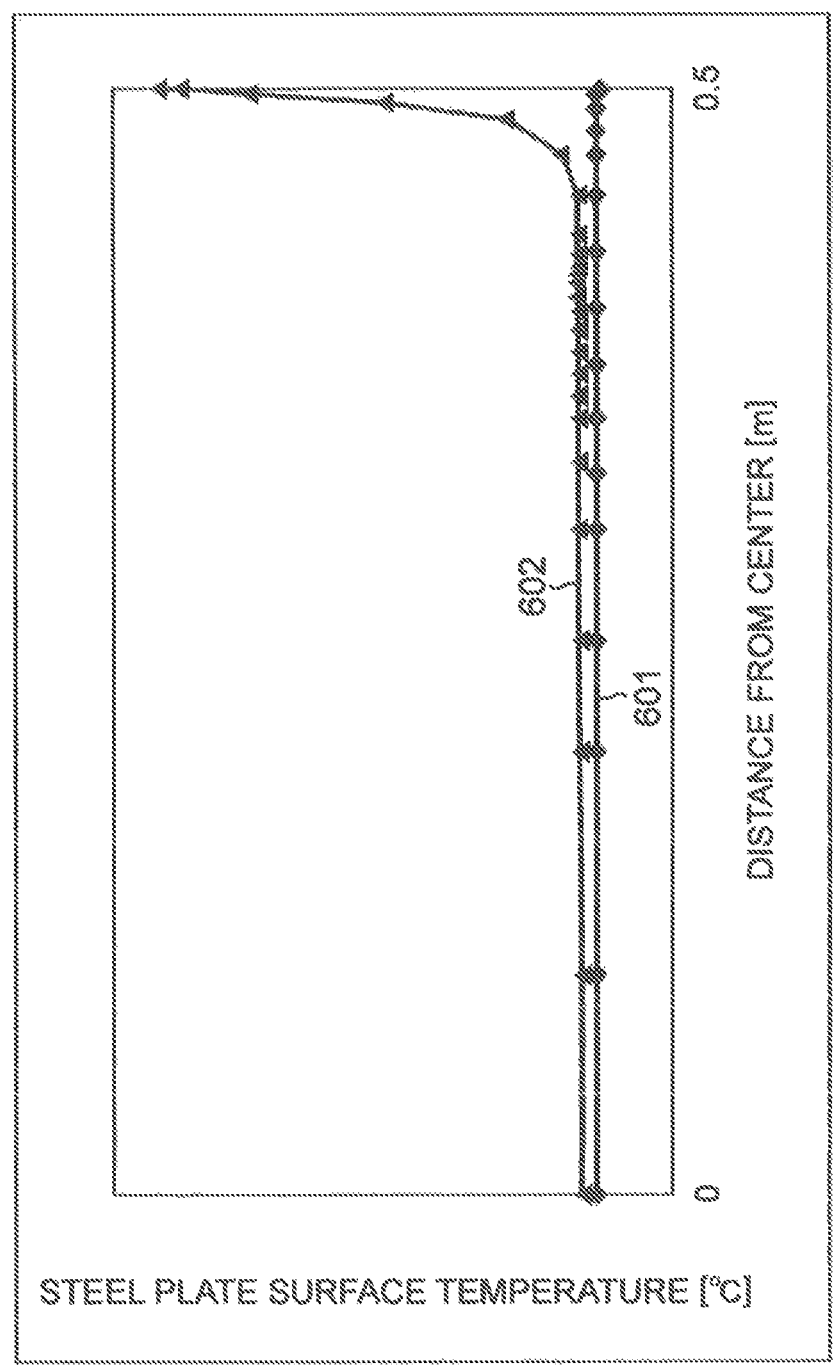
FIG. 6 is a view illustrating one example of a distribution of surface temperatures of the conductor plate in a width direction.

FIG. 6 is a view illustrating one example (actual measured values) of a distribution of surface temperatures of the conductor plate in the width direction (X-axis direction). Here, a steel plate was used as the conductor plate. In FIG. 6, the distance from the center means the distance from the center position of the steel plate in the width direction (X-axis direction) in the case where measurement is performed along the width direction (X-axis direction) of the steel plate. In FIG. 6, the center position of the steel plate in the width direction (X-axis direction) is set to 0 (zero). Further, in FIG. 6, only a half of the width-direction (X-axis-direction) region of the steel plate is illustrated.

The present inventors performed each measurement in the case where the directions of alternating currents to be applied to the first coil 110 and the second coil 120 were set opposite like this embodiment and in the case where the directions of alternating currents to be applied to the first coil 110 and the second coil 120 were set the same like the TF-type induction heating device. When performing these measurements, measurement conditions other than the directions of the alternating currents to be applied to the first coil 110 and the second coil 120 were set the same.

The concrete measurement conditions are as follows.
Steel plate plate thickness: 1.1 [mm]
Steel plate plate width: 1 [m]
Passing speed: 55 [m/min]
Conductivity at a target heating temperature of the steel plate: $1.0 \times 10^7$ [S/m]

Effective permeability at a target heating temperature of the steel plate: 80

Current: 10000 [AT]

Current frequency: 10 [kHz]

From the above, the depth of penetration δ of the current (at the target heating temperature of the steep plate) expressed by (1) Expression becomes 0.18 [mm].

In FIG. 6, a graph 601 indicates the result of the case where the directions of the alternating currents to be applied to the first coil 110 and the second coil 120 were set opposite. A graph 602 indicates the result of the case where the directions of the alternating currents to be applied to the first coil 110 and the second coil 120 were set the same. In either case, at the center (center position in the width direction (X-axis direction)), the surface temperature of the steel plate increased to about 200[° C.].

Further, in the case where the directions of the alternating currents to be applied to the first coil 110 and the second coil 120 were set opposite, the deviation of the surface temperature of the steel plate in the width direction (X-axis direction) (value obtained by subtracting the minimum value from the maximum value) was 2[° C.] (see the graph 601). On the other hand, in the case where the directions of the alternating currents to be applied to the first coil 110 and the second coil 120 were set the same, the surface temperature of the steel plate at the end portions (edge portions) in the width direction (X-axis direction) increased much higher than the other region and exceeded 1300[° C.] (see the graph 602).

In this embodiment as above, the first coil 110 and the second coil 120 are faced each other across the conductor plate S so that the positions of the first coil 110 and the second coil 120 in the Y-axis direction (passing direction of the conductor plate S) become substantially the same. Then, the alternating currents at the frequency f at which the depth of penetration δ of the current becomes equal to or less than half the plate thickness d of the conductor plate S are applied to the first coil 110 and the second coil 120 in opposite directions, thereby inductively heating the passing conductor plate S.

Accordingly, the UF-type induction heating device 100 can be formed of only the coils and the cores. Thus, it becomes no longer necessary to provide special structure members such as the conductor plate and the secondary coils for suppressing overheating of the width-direction end portions (edge portions) of the conductor plate S like the TF-type induction heating device. Further, it is not necessary to provide special structures for suppressing overheating of the width-direction end portions (edge portions) of the conductor plate S. Accordingly, it becomes no longer necessary to change setting of the induction heating device 100 according to the width of the conductor plate S.

Further, in the UF-type induction heating device 100, the magnetic fields are generated in a direction vertical to the plate surface of the conductor plate S similarly to the TF-type induction heating device. Accordingly, it is possible to use the coils similar to those in the TF-type induction heating device as the first coil 110 and the second coil 120. Thus, in the UF-type induction heating device 100, temporary retraction is enabled easily without providing a mechanism for separating the coils. Further, since it is not necessary to provide a mechanism for separating the coils, it is possible to reduce a burden of a maintenance work of the coils. As above, as long as the conditions of a current to be used and a frequency are satisfied, the UF-type induction heating device 100 can be fabricated by using the TF-type induction heating device (the coils and the cores) and applying the currents opposite in direction to the coils as described previously. Accordingly, in the case where the TF-type induction heating device exists, the UF-type induction heating device 100 can be fabricated without greatly changing a facility.

As above, in the UF-type induction heating device 100 in this embodiment, it is possible to suppress overheating of the width-direction end portions (edge portions) of the conductor plate S, and achieve two things, which are to uniformize the temperature distribution in the width direction of the conductor plate S as much as possible and to retract the coils temporarily with a simple constitution, without adding a special constitution for temporarily retracting the coils.

Further, in the UF-type induction heating device 100 in this embodiment, the magnetic fields that are the same in magnitude and opposite in direction are generated in regions where the conductor plate S does not exist between the first core 130 and the second core 140 (end portion regions in the width direction (X-axis direction) of the induction heating device 100) of a region between the first core 130 and the second core 140. Accordingly, the magnetic fields in these regions are offset.

Thus, in the UF-type induction heating device 100, it is possible to minimize the magnetic field that leaks to the surroundings around the UF-type induction heating device 100, and it is also possible to suppress electromagnetic interference to the surroundings to the minimum.

Further, a general induction heating device generates strong magnetic fields by coils and cores in the case where there is no conductor plate S being a load. For this reason, an inductance of the induction heating device increases. Thus, when an alternating current starts being applied to the coil, voltages at both ends of the coil increase rapidly. Therefore, in the case where there is no conductor plate S, it is not easy to apply the alternating current to the coil up to a rated current of the induction heating device, and thus it is sometimes impossible to confirm soundness of a power supply system beforehand.

In contrast to this, in the UF-type induction heating device 100 in this embodiment, the magnetic fields are offset to almost disappear in the region other than the region between the first coil 110 and the second coil 120. For this reason, the inductance of the UF-type induction heating device 100 is close to 0 (zero), and even in a state where there is no conductor plate S, it is possible to apply the current to the first coil 110 and the second coil 120 up to a rated current of the UF-type induction heating device 100. Thus, it is possible to confirm the soundness of the power supply system beforehand.

Further, in the UF-type induction heating device 100 in this embodiment, the inductance is small as compared to a general induction heating device even when the conductor plate S is being heated. For this reason, as compared to a general induction heating device, it is possible to reduce the voltage to be applied to the both ends of the coils (first coil 110 and the second coil 120). Thus, it is possible to suppress a capacity of the alternating-current power supply 200. Further. a burden of an insulating treatment on the first coil 110 and the second coil 120 is reduced. Further, it is possible to suppress trouble caused by discharge of the first coil 110 and the second coil 120.

Further, in this embodiment, the upper end surfaces and the lower end surfaces of the first coil 110 and the second coil 120 when viewed along the passing direction of the conductor plate S (Y-axis direction in the example illustrated in FIG. 1) are made flat. Further, upper end surfaces and lower end surfaces of the first core 130 and the second core 140 when viewed along the passing direction of the conductor plate S are also made flat in conformity with the first coil 110 and the second coil 120. Thus, it is possible to increase heating efficiency of the UF-type induction heating device 100. Further, it is possible to safely perform passing of the conductor plate S and retraction. Further, it is possible to sufficiently offset the magnetic fields in the regions without the conductor plate S between the first core 130 and the second core 140 out of the region between the first core 130 and the second core 140.

Modified Example

In this embodiment, there has been explained, as an example, the case where the frequency (f of (1) Expression)) of the alternating currents to be applied to the first coil 110 and the second coil 120 is determined so that the depth of penetration δ of the current in the conductor plate S becomes equal to or less than ½ times of the plate thickness d [m] (=d/2) of the conductor plate S. This makes it possible to increase the heating efficiency in the UF-type induction heating device 100, and thus it is preferred. However, it is not always necessary to determine the frequency of the alternating currents to be applied to the first coil 110 and the second coil 120 as above within a range where induction heating of the conductor plate S is enabled.

Figure 7:
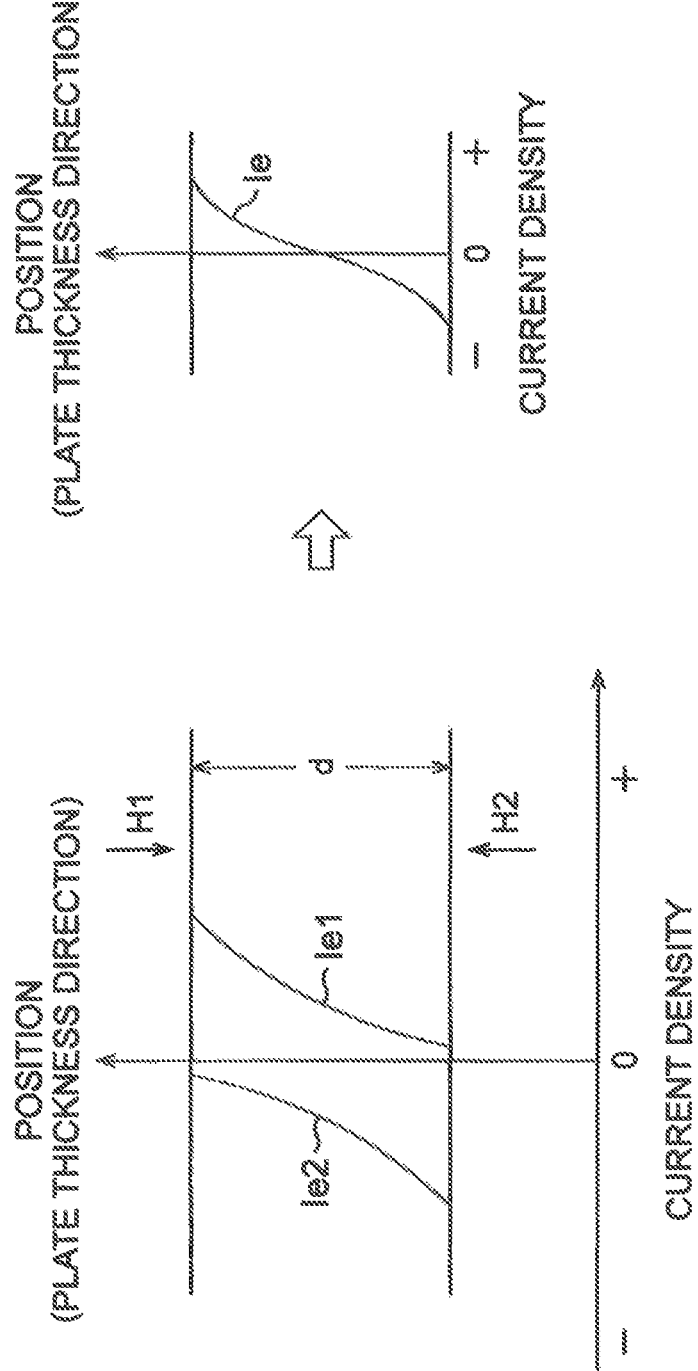
FIG. 7 is a view conceptually illustrating one example of the relationship between a position of the conductor plate in a plate thickness direction and current densities of the eddy currents flowing through the conductor plate.

FIG. 7 is a view conceptually illustrating one example of the relationship between the position of the conductor plate S in the plate thickness direction and current densities of the eddy currents Ie1, Ie2 flowing through the conductor plate S.

As has been explained while referring to FIG. 4, by the magnetic field H1, the eddy current Ie1 flows through the one surface (upper surface) of the conductor plate S, and by the magnetic field H2, the eddy current Ie2 flows through the other surface (lower surface) of the conductor plate S in a direction opposite to the eddy current Ie1 (see the left drawing in FIG. 7). Even when the depth of penetration δ of the eddy currents Ie1, Ie2 is the thickness d of the conductor plate S, as illustrated in the left drawing in FIG. 7, the current densities of the eddy currents Ie1, Ie2 are not constant in the plate thickness direction of the conductor plate S and become smaller as it goes farther from the surface. Thus, as illustrated in the right drawing in FIG. 7, although one part of the eddy current Ie1 and one part of the eddy current Ie2 are offset, the other parts of them are not offset but exist. Therefore, it is also possible to determine the frequency (f in (1) Expression) of the alternating currents to be applied to the first coil 110 and the second coil 120 so that the depth of penetration δ of the current in the conductor plate S becomes equal to or less than (or less than) the plate thickness d [m] of the conductor plate S, for example. That is, in place of (1) Expression, the condition of $\delta \leq d$ or $\delta < d$ may be employed.

Further, in this embodiment, there has been explained, as an example, the case where the single alternating-current power supply 200 applies the alternating currents to the first coil 110 and the second coil 120. However, the number of alternating-current power supplies is not limited to one as long as the directions of the magnetic fields generated by the alternating currents flowing through the first coil 110 and the second coil 120 are designed to be opposite to each other.

Figure 8:
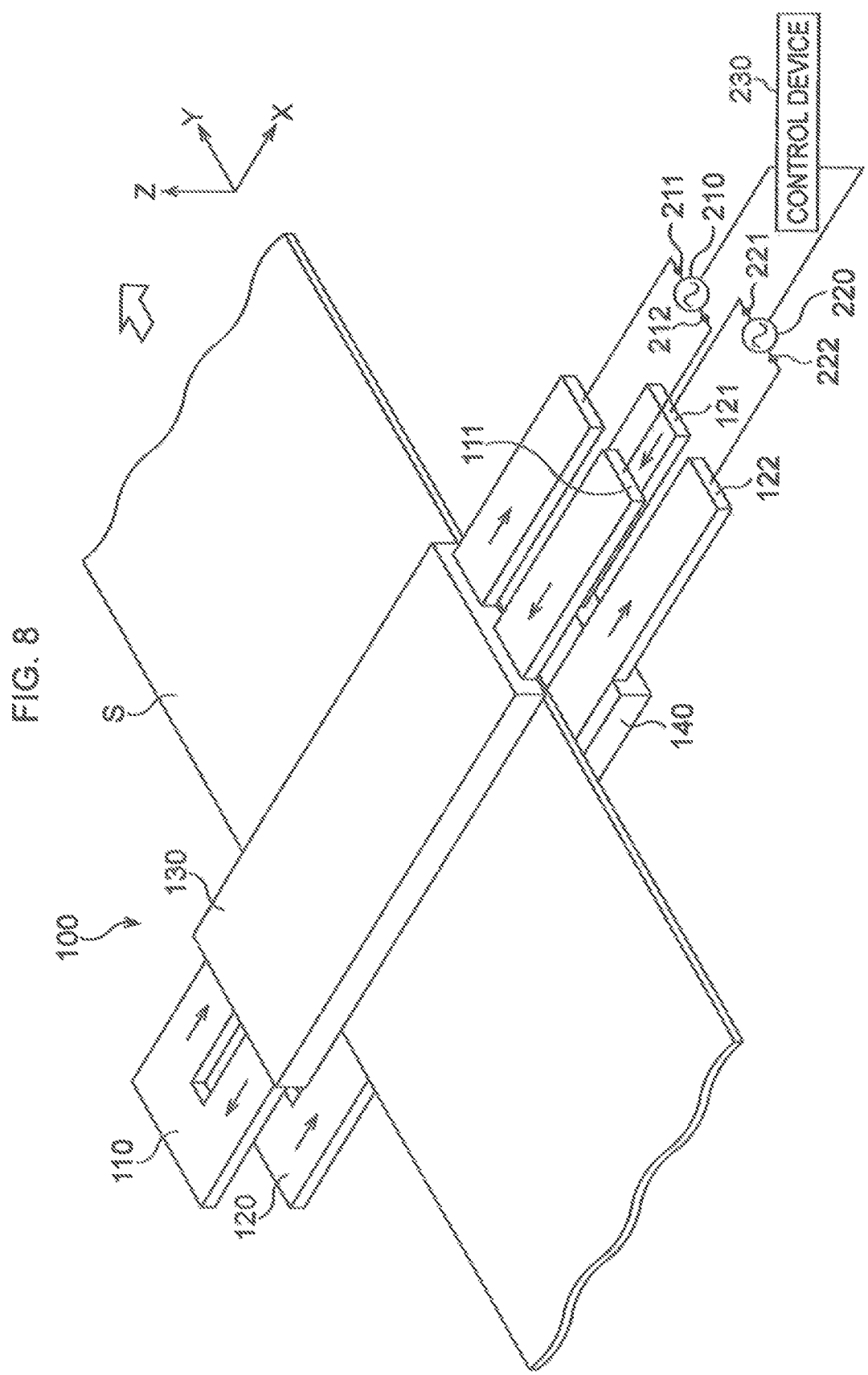
FIG. 8 is a view illustrating a first modified example of the constitution of the induction heating system.

FIG. 8 is a view illustrating a first modified example of the constitution of the induction heating system. Concretely, FIG. 8 is a view illustrating the state of an induction heating device 100 viewed from above.

In FIG. 8, the induction heating system includes an UF-type induction heating device 100, alternating-current power supplies 210, 220, and a control device 230.

The UF-type induction heating device 100 is the same as that illustrated in FIG. 1. The alternating-current power supplies 210, 220 are the same as the alternating-current power supply 200 illustrated in FIG. 1. One end portion 111 of a first coil 110 is electrically connected to one terminal 211 of two output terminals of the alternating-current power supply 210, and the other end portion 112 of the first coil 110 is electrically connected to the other terminal 212 of the two output terminals of the alternating-current power supply 210. One end portion 121 of a second coil 120 is electrically connected to one terminal 221 of two output terminals of the alternating-current power supply 220, and the other end portion 122 of the second coil 120 is electrically connected to the other terminal 222 of the two output terminals of the alternating-current power supply 220. The alternating-current power supplies 210, 220 operate in synchronization with each other. That is, the alternating-current power supplies 210, 220 apply alternating currents having the same waveform at the same frequency to the first coil 110 and the second coil 120 respectively at the time same. However, the directions of the alternating currents flowing through mutually facing regions of the first coil 110 and the second coil 120 (at the same time) are designed to be opposite to each other. The control device 230 controls output timings in the alternating-current power supplies 210, 220 in order for the alternating-current power supplies 210, 220 to operate in synchronization with each other as above.

As above, as long as the two alternating-current power supplies are designed only to synchronize, for example, they may be connected to the first coil 110 and the second coil 120 one by one individually.

Further, in FIG. 8, there has been explained, as an example, the case where the two alternating-current power supplies 210, 220 are arranged at one end portion side (positive direction side of the X axis) of width-direction end portions of the conductor plate S. However, it is not always necessary to apply such an arrangement. For example, it is also possible to arrange the alternating-current power supply 210 that applies the current to the first coil 110 at one end portion side (positive direction side of the X axis) of the width-direction end portions of the conductor plate S and arrange the alternating-current power supply 220 that applies the current to the second coil 120 at the other end portion side (negative direction side of the X axis) of them. In this case, the second coil 120 illustrated in FIG. 8 is arranged in a state of being turned by 180° in an X-Y plane (namely about the Z axis as a turning axis).

Further, in this embodiment, there has been explained, as an example, the case where the first coil 110 and the second coil 120 are connected in parallel and the single alternating-current power supply 200 applies the alternating currents in parallel to the first coil 110 and the second coil 120. However, as long as the directions of the magnetic fields generated by the alternating currents flowing through the first coil 110 and the second coil 120 are designed to be opposite to each other, the single alternating-current power supply 200 may apply the alternating currents in series to the first coil 110 and the second coil 120.

Figure 9:
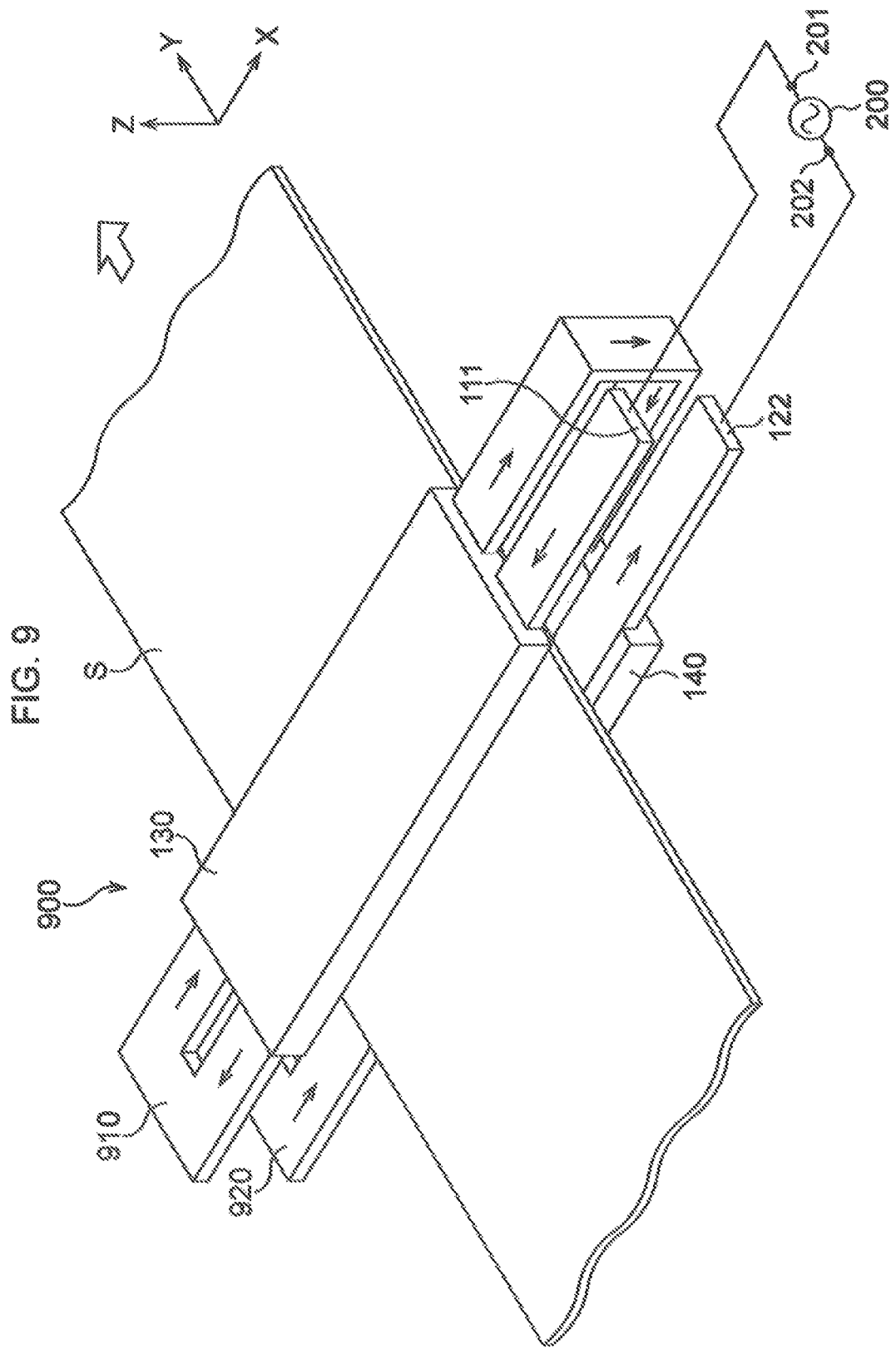
FIG. 9 is a view illustrating a second modified example of the constitution of the induction heating system.

FIG. 9 is a view illustrating a second modified example of the constitution of the induction heating system. Concretely, FIG. 9 is a view illustrating the state of an induction heating device 900 viewed from above.

In FIG. 9, the induction heating system includes an UF-type induction heating device 900, and an alternating-current power supply 200.

The UF-type induction heating device 900 includes a first coil 910, a second coil 920, a first core 130, and a second core 140.

The first core 130 and the second core 140 are the same as those illustrated in FIG. 1. The first coil 910 and the second coil 920 are coupled by the other end portion 112 of the first coil 110 and the one end portion 121 of the second coil 120, which are illustrated in FIG. 1. Other than that, the first coil 910 and the second coil 920 and the first coil 110 and the second coil 120 are the same. One end portion 111 of the first coil 910 is electrically connected to one terminal 201 of two output terminals of the alternating-current power supply 200, and the other end portion 122 of the second coil 920 is electrically connected to the other terminal 202 of the two output terminals of the alternating-current power supply 200. As above, the first coil 910 and the second coil 920 are directly connected, and the single alternating-current power supply 200 can apply the alternating current to the first coil 910 and the second coil 920 in series. Incidentally, in the constitution illustrated in FIG. 9, the UF-type induction heating device 900 is retracted temporarily to the positive direction side of the X axis.

Further, in this embodiment, there has been explained, as an example, the case where the distance between the first coil 110 and the conductor plate S and the distance between the second coil 120 and the conductor plate S are equalized, but as long as the first coil 110 and the second coil 120 exist at positions enabling the conductor plate S to be heated, it is not necessary to completely equalize the distance between the first coil 110 and the conductor plate S and the distance between the second coil 120 and the conductor plate S. This is because the depth of penetration δ of the current in the conductor plate S does not rely on the distances between first coil 110 and the conductor plate S and between the second coil 120 and the conductor plate S.

However, as the temperature of the conductor plate S increases, the relative permeability $\mu_s$ of the conductor plate S decreases rapidly. When the temperature of the conductor plate S reaches the Curie temperature, the relative permeability $\mu_s$ of the conductor plate S becomes one, which is the same as that in a vacuum. When the temperature is equal to or more than this temperature, (2) Expression is sometimes no longer established by (1) Expression. Thus, it is necessary to confirm beforehand whether the temperature zone of the conductor plate S (for example, the target heating temperature) falls within a range where (2) Expression is established by (1) Expression. In the meantime, in terms of the resistivity ρ, such a rapid change relying on the temperature as the relative permeability does not occur, and thus a special consideration is not required generally.

Further, in this embodiment, there has been explained, as an example, the case where of the UF-type induction heating device 100 (the first coil 110, the second coil 120, the first core 130, and the second core 140), the conductor plate S is longer in the width direction (X-axis direction) than in the passing direction (Y-axis direction). However, contrary to this, it is also possible to constitute the UF-type induction heating device (the first coil, the second coil, the first core, and the second core) so that of the UF-type induction heating device, the conductor plate S becomes longer in the passing direction (Y-axis direction) than in the width direction (X-axis direction).

Further, in this embodiment, there has been explained, as an example, the case where the shape of a cross section vertical to the flowing direction of the alternating current from the alternating-current power supply 200, which is the shape of the first coil 110 and the second coil 120, is a hollow rectangle (see FIG. 2). However, such a shape may be another shape such as a hollow circular shape or a hollow elliptical shape. Further, the first coil 110 and the second coil 120 do not need to have a hollow shape. Further, the method of cooling the first coil 110 and the second coil 120 may be an air cooling method, an external water cooling method, or a combined method of the respective cooling methods.

Further, such use of the first core 130 and the second core 140 as this embodiment makes it possible to increase the magnitude of the magnetic fields to be applied to the conductor plate S, and this makes it possible to improve the heating efficiency of the conductor plate S, and thus it is preferred. Further, use of the first core 130 and the second core 140 makes it possible to suppress the electromagnetic interference to the surroundings of the UF-type induction heating device 100, and thus it is preferred. However, it is not always necessary to use the first core 130 and the second core 140.

Further, when the frequency to be used is high, the cores generate heat, and thus there is sometimes a case that it is impossible to use the cores. In such a case, the UF-type induction heating device is constituted without using the first core 130 and the second core 140.

Further, in this embodiment, there has been explained, as an example, the case where the number of turns of each of the first coil 110 and the second coil 120 is one [time] (one turn). However, the number of turns of each of the first coil 110 and the second coil 120 may be two [times] or more.

Further, in this embodiment, there has been explained, as an example, the case where the single UF-type induction heating device 100 is arranged for the conductor plate S. However, there is sometimes a case that the single UF-type induction heating device 100 fails to increase the temperature of the conductor plate S up to a desired temperature due to the capacity shortage of the alternating-current power supply 200, for example. Further, there is sometimes a case that there is no installation space of the UF-type induction heating device 100, to thus make it impossible to arrange the large-sized UF-type induction heating device 100. Further, there is sometimes a case that a temperature pattern of the conductor plate S is restricted and the temperature pattern needs a plurality of temperature increasing processes. Thus, a plurality of the UF-type induction heating devices 100 may be arranged parallel to the passing direction of the conductor plate S. In this case, each one alternating-current power supply 200 can be connected to each of the UF-type induction heating devices 100. It is not necessary for these plural alternating-current power supplies 200 to equalize at least one of their voltages, currents, and frequencies. Further, the number of turns of the coils and the material of the coils may be changed in each induction heating device. Further, when the capacity of the alternating-current power supply 200 is large, it is also possible to connect this alternating-current power supply 200 to the plural UF-type induction heating devices 100.

Further, it is also possible that one first core and one second core are each provided, a plurality of first coils and a plurality of second coils are provided in the first core and the second core respectively, and the first coils and the second coils are each arranged parallel to the passing direction of the conductor plate S.

Figure 10:
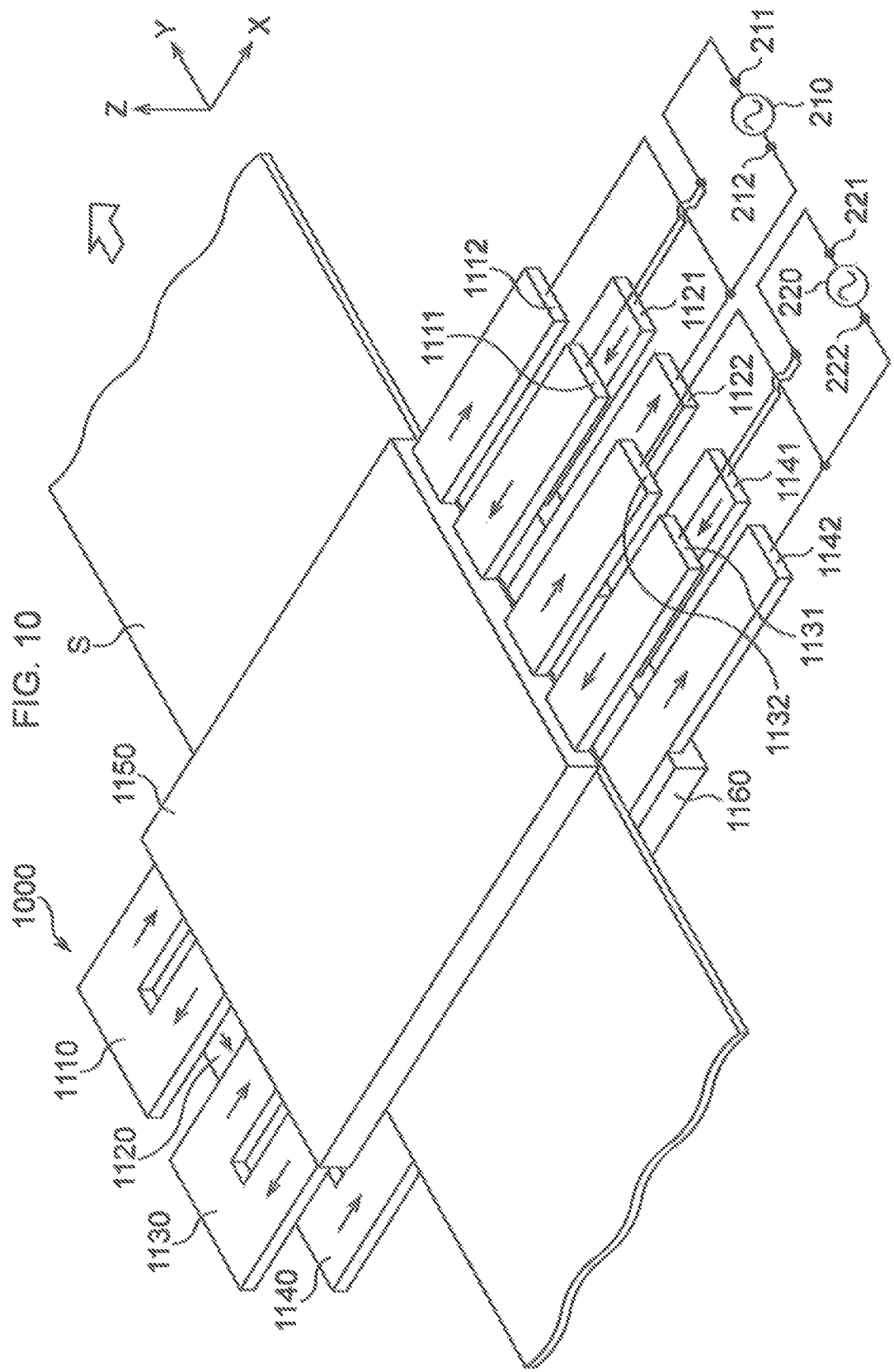
FIG. 10 is a view illustrating a third modified example of the constitution of the induction heating system.

FIG. 10 is a view illustrating a third modified example of the constitution of the induction heating system. Concretely, FIG. 10 is a view illustrating the state of an induction heating device 1000 viewed from above. In FIG. 10, the induction heating system includes an UF-type induction heating device 1000, and alternating-current power supplies 210, 220.

The UF-type induction heating device 1000 includes two first coils 1110, 1130, two second coils 1120, 1140, a first core 1150, and a second core 1160.

The first coils 1110, 1130 and the second coils 1120, 1140 are the same as the first coil 110 and the second coil 120 illustrated in FIG. 1. The alternating-current power supplies 210, 220 are the same as the alternating-current power supply 200 illustrated in FIG. 1.

Figure 11:
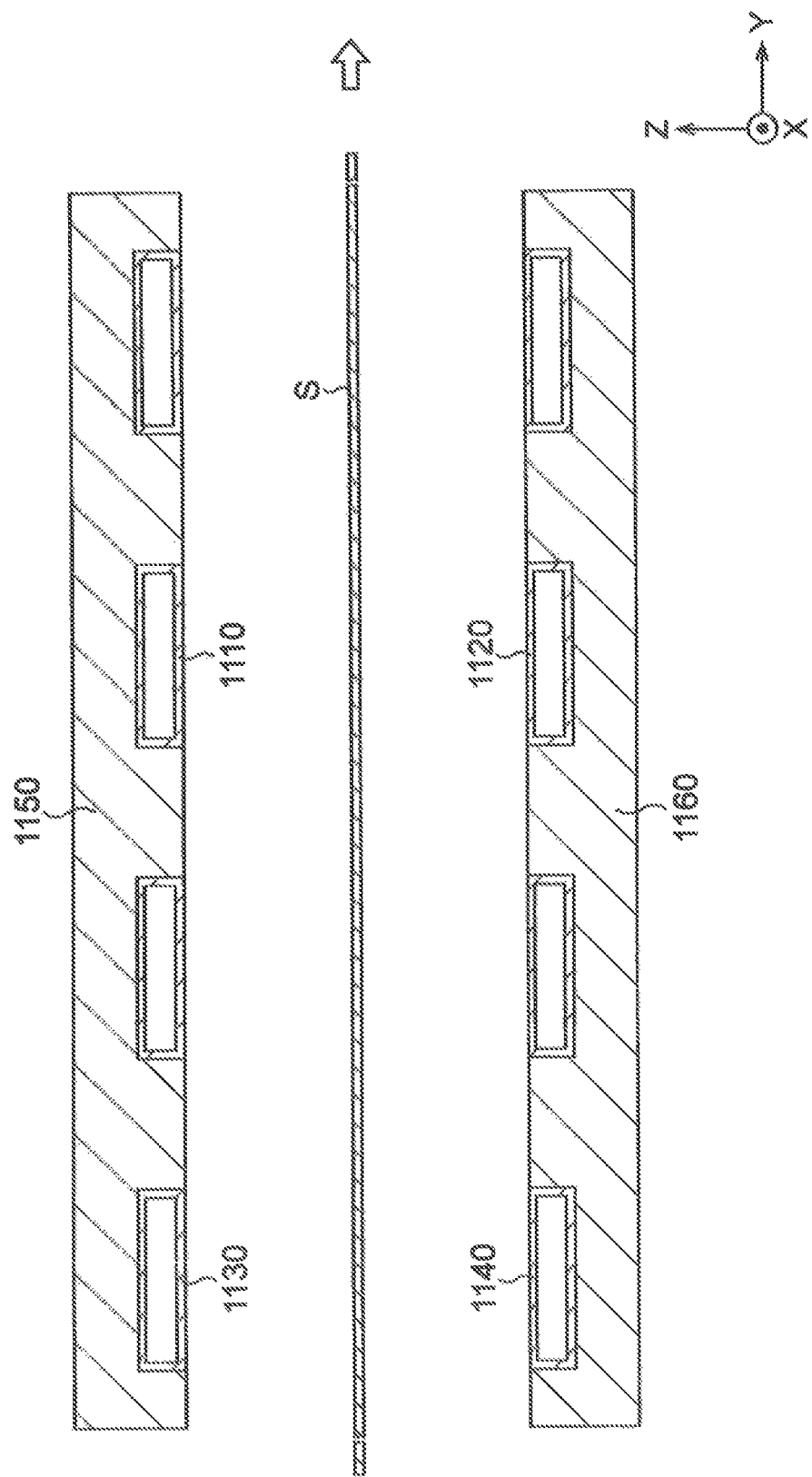
FIG. 11 is a view illustrating one example of a Y-Z cross section of an UF-type induction heating device in the third modified example.
Figure 12:
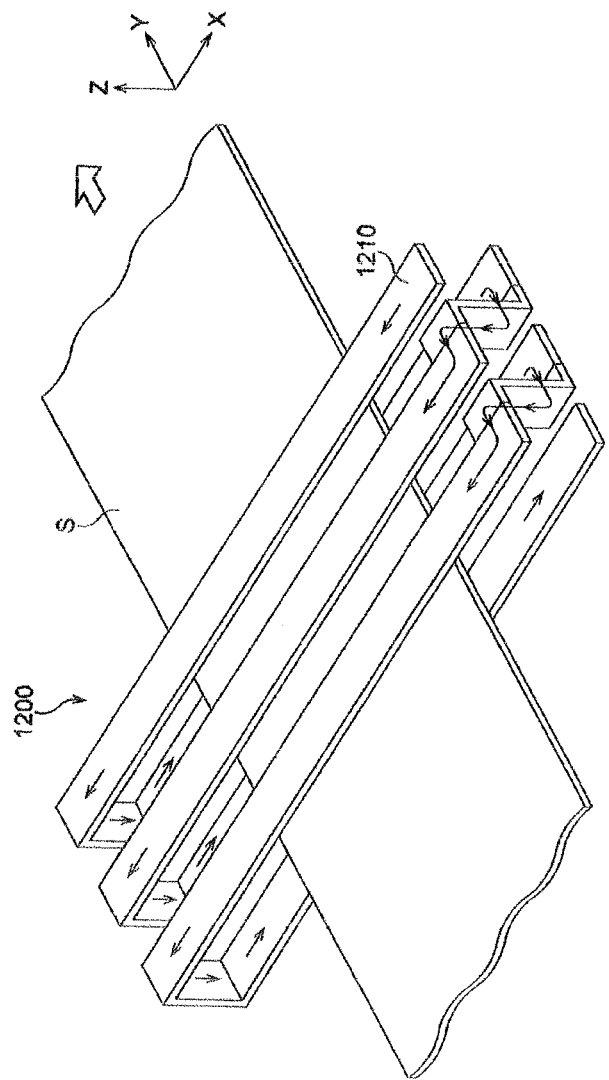
FIG. 12 is a view illustrating a constitution of a LF-type induction heating device.

FIG. 11 is a view illustrating one example of a Y-Z cross section of the UF-type induction heating device 1000 in the third modified example. FIG. 11 is a view corresponding to FIG. 2.

The first core 1150 and the second core 1160 are cores that are the same in material, shape, and size. The first core 1150 and the second core 1160 are each formed of a soft magnetic material such as ferrite, for example, similarly to the first core 130 and the second core 140 illustrated in FIG. 1.

As illustrated in FIG. 10 and FIG. 11, in this modified example, the first core 1150 has a shape obtained by forming recessed portions in a rectangular parallelepiped shape according to shapes of regions extending in the width direction (X-axis direction) of the first coils 1110, 1130. In this modified example as well, the recessed portions of the first core 1150 are formed so that in the case where the first coils 1110, 1130 are arranged in the recessed portions, the surfaces of the first coils 1110, 1130 facing the conductor plate S and the surfaces of the first core 1150 facing the conductor plate S become substantially flush with each other.

Similarly, the second core 1160 has a shape obtained by forming recessed portions in a rectangular parallelepiped shape according to shapes of regions extending in the width direction (X-axis direction) of the second coils 1120, 1140. Further, the recessed portions of the second core 1160 are formed so that in the case where the second coils 1120, 1140 are arranged in the recessed portions, the surfaces of the second coils 1120, 1140 facing the conductor plate S and the surface of the second core 1160 facing the conductor plate S become substantially flush with each other.

However, the reason why these do not need to be substantially flush with each other is as described previously.

As illustrated in FIG. 10, one end portion 1111 of the first coil 1110 is electrically connected to one terminal 211 of two output terminals of the alternating-current power supply 210. Further, the other end portion 1112 of the first coil 1110 is electrically connected to the other terminal 212 of the two output terminals of the alternating-current power supply 210.

Further, out of two end portions of the second coil 1120, one end portion 1121 at a position facing the other end portion 1112 of the first coil 1110 each other in the Z-axis direction is electrically connected to the one terminal 211 of the two output terminals of the alternating-current power supply 210. Further, out of the two end portions of the second coil 1120, the other end portion 1122 at a position facing the one end portion 1111 of the first coil 1110 each other in the Z-axis direction is electrically connected to the other terminal 212 of the two output terminals of the alternating-current power supply 210.

Further, one end portion 1131 of the first coil 1130 is electrically connected to one terminal 221 of two output terminals of the alternating-current power supply 220. Further, the other end portion 1132 of the first coil 1130 is electrically connected to the other terminal 222 of the two output terminals of the alternating-current power supply 220.

Further, out of two end portions of the second coil 1140, one end portion 1141 at a position facing the other end portion 1132 of the first coil 1130 each other in the Z-axis direction is electrically connected to the one terminal 221 of the two output terminals of the alternating-current power supply 220. Further, out of the two end portions of the second coil 1140, the other end portion 1142 at a position facing the one end portion 1130 of the first coil 1130 each other in the Z-axis direction is electrically connected to the other terminal 222 of the two output terminals of the alternating-current power supply 220.

As above, the first coil 1110 and the second coil 1120 are connected in parallel to the alternating-current power supply 210 so that the turning direction of the first coil 1110 and the turning direction of the second coil 1120, (which are viewed from the alternating-current power supply 210), become opposite to each other. Similarly, the first coil 1130 and the second coil 1140 are connected in parallel to the alternating-current power supply 220 so that the turning direction of the first coil 1130 and the turning direction of the second coil 1140, (which are viewed from the alternating-current power supply 220), become opposite to each other.

Thus, when the alternating-current power supply 210 applies alternating currents, as illustrated in FIG. 10, the directions of the alternating currents flowing through mutually facing regions of the first coil 1110 and the second coil 1120 (at the same time) become opposite to each other (see arrow lines illustrated in the first coil 1110 and the second coil 1120 in FIG. 10). Similarly, when the alternating-current power supply 220 applies alternating currents, as illustrated in FIG. 10, the directions of the alternating currents flowing through mutually facing regions of the first coil 1130 and the second coil 1140 (at the same time) become opposite to each other (see arrow lines illustrated in the first coil 1130 and the second coil 1140 in FIG. 10).

In FIG. 10, there has been explained, as an example, the case where the directions of the alternating currents (at the same time) flowing through the two first coils 1110, 1130 arranged in parallel to the passing direction of the conductor plate S are the same and the directions of the alternating currents (at the same time) flowing through the two second coils 1120, 1140 arranged in parallel to the passing direction of the conductor plate S are the same. However, as long as it is designed that directions of magnetic fields generated by the alternating currents flowing through the first coil 1110 and the second coil 1120 become opposite to each other and directions of magnetic fields generated by the alternating currents flowing through the first coil 1130 and the second coil 1140 become opposite to each other, the directions of the alternating currents (at the same time) flowing through the first coils 1110, 1130 and the directions of the alternating currents (at the same time) flowing through the second coils 1120, 1140 may be opposite.

Further, since it is possible to sufficiently exhibit the effects of increasing the heating efficiency of the UF-type induction heating device 100 and the like as described previously, the upper end surfaces and the lower end surfaces of the first coil 110 and the second coil 120 when viewed along the passing direction of the conductor plate S (Y-axis direction in the example illustrated in FIG. 1) are preferably made flat. However, the upper end surfaces and the lower end surface of the first coil and the second coil when viewed along the passing direction of the conductor plate S are not limited to being flat. The upper end surfaces and the lower end surfaces of the first coil and the second coil when viewed along the passing direction of the conductor plate S may be a smooth curved surface or bent surface so that the distance between the first coil and the conductor plate S and the distance between the second coil and the conductor plate S become longer as it is at a position closer to the center of the conductor plate S when viewed along the passing direction of the conductor plate S, for example. Further, the upper end surfaces and the lower end surfaces of the first coil and the second coil when viewed along the passing direction of the conductor plate S may be a smooth curved surface or bent surface so that the distance between the first coil and the conductor plate S and the distance between the second coil and the conductor plate S become shorter as it is at a position closer to the center of the conductor plate S when viewed along the passing direction of the conductor plate S, for example. When cores are provided on the above first coil and second coil, upper end surfaces and lower end surfaces of the cores when viewed along the passing direction of the conductor plate S can be set to a smooth curved surface or bent surface according to shapes of the first coil and the second coil.

Besides, at least two of the above modified examples may be combined.

It should be noted that the above explained embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention can be utilized for induction heating of a conductor plate.

The invention claimed is:

1. An induction heating device being an induction heating device that inductively heats a passing conductor plate, the induction heating device comprising:
    a first coil that generates a magnetic field in a plate thickness direction of the conductor plate by an alternating current flowing therethrough; and
    a second coil that generates a magnetic field in the plate thickness direction of the conductor plate by an alternating current flowing therethrough, wherein
    the first coil and the second coil are positioned to sandwich the conductor plate therebetween,
    the first coil and the second coil are substantially the same in position in a passing direction of the conductor plate,
    magnetic fields that are opposite to each other in direction are generated in the plate thickness direction of the conductor plate from the first coil and the second coil by the alternating currents,
    eddy currents are generated inside the conductor plate by the magnetic fields that are opposite to each other in the plate thickness direction of the conductor plate, and
    the conductor plate is inductively heated by the eddy currents.

2. The induction heating device according to claim 1, wherein
    as the alternating currents, alternating currents at a frequency f in a range where (A) Expression below is satisfied are applied to the first coil and the second coil, and thereby the magnetic fields that are opposite to each other in direction are generated in the plate thickness direction of the conductor plate from the first coil and the second coil, In (A) Expression, d is a plate thickness [m] of the conductor plate, In (A) Expression, δ is a depth of penetration of the current in the conductor plate and is expressed by (B) Expression below, In (B) Expression, ρ is resistivity [Ω·m] of the conductor plate, f is the frequency [Hz] of the alternating currents, and $\mu_s$ is relative permeability of the conductor plate,

[Mathematical expression 1]

$$\delta \leq d \qquad (A)$$

$$\delta = 503\sqrt{\frac{\rho}{\mu_s f}}. \qquad (B)$$

3. The induction heating device according to claim 2, wherein
    the number of turns of the first coil and the number of turns of the second coil are the same.

4. The induction heating device according to claim 2, further comprising:
    a first core that is arranged at a position to be a magnetic path of magnetic fluxes generated from the first coil and is intended for generating a magnetic field between the first core and the conductor plate; and
    a second core that is arranged at a position to be a magnetic path of magnetic fluxes generated from the second coil and is intended for generating a magnetic field between the second core and the conductor plate, wherein
    by the alternating currents, magnetic fields that are opposite to each other in direction are generated in the plate thickness direction of the conductor plate between the first core and the conductor plate and between the second core and the conductor plate, and by the magnetic fields opposite to each other in the plate thickness direction of the conductor plate, eddy currents opposite to each other in direction are generated inside the conductor plate.

5. The induction heating device according to claim 2, wherein
    by the magnetic fields opposite to each other in the plate thickness direction of the conductor plate, eddy currents opposite to each other in direction are generated in two regions with a distance therebetween in the passing direction of the conductor plate, the two regions being regions vertical to the passing direction of the conductor plate inside the conductor plate, without generating an eddy current along the passing direction of the conductor plate in width-direction end portions of the conductor plate.

6. The induction heating device according to claim 2, wherein
    each of the eddy currents forms one closed loop passing through region on a first surface side of the conductor plate and region on a second surface side of the conductor plate sandwiching center in plate thickness direction of the conductor plate.

7. The induction heating device according to claim 1, wherein the number of turns of the first coil and the number of turns of the second coil are the same.

8. The induction heating device according to claim 7, further comprising:
a first core that is arranged at a position to be a magnetic path of magnetic fluxes generated from the first coil and is intended for generating a magnetic field between the first core and the conductor plate; and
a second core that is arranged at a position to be a magnetic path of magnetic fluxes generated from the second coil and is intended for generating a magnetic field between the second core and the conductor plate, wherein
by the alternating currents, magnetic fields that are opposite to each other in direction are generated in the plate thickness direction of the conductor plate between the first core and the conductor plate and between the second core and the conductor plate, and by the magnetic fields opposite to each other in the plate thickness direction of the conductor plate, eddy currents opposite to each other in direction are generated inside the conductor plate.

9. The induction heating device according to claim 7, wherein
by the magnetic fields opposite to each other in the plate thickness direction of the conductor plate, eddy currents opposite to each other in direction are generated in two regions with a distance therebetween in the passing direction of the conductor plate, the two regions being regions vertical to the passing direction of the conductor plate inside the conductor plate, without generating an eddy current along the passing direction of the conductor plate in width-direction end portions of the conductor plate.

10. The induction heating device according to claim 7, wherein
each of the eddy currents forms one closed loop passing through region on a first surface side of the conductor plate and region on a second surface side of the conductor plate sandwiching center in plate thickness direction of the conductor plate.

11. The induction heating device according to claim 1, further comprising:
a first core that is arranged at a position to be a magnetic path of magnetic fluxes generated from the first coil and is intended for generating a magnetic field between the first core and the conductor plate; and
a second core that is arranged at a position to be a magnetic path of magnetic fluxes generated from the second coil and is intended for generating a magnetic field between the second core and the conductor plate, wherein
by the alternating currents, magnetic fields that are opposite to each other in direction are generated in the plate thickness direction of the conductor plate between the first core and the conductor plate and between the second core and the conductor plate, and by the magnetic fields opposite to each other in the plate thickness direction of the conductor plate, eddy currents opposite to each other in direction are generated inside the conductor plate.

12. The induction heating device according to claim 11, wherein
by the magnetic fields opposite to each other in the plate thickness direction of the conductor plate, eddy currents opposite to each other in direction are generated in two regions with a distance therebetween in the passing direction of the conductor plate, the two regions being regions vertical to the passing direction of the conductor plate inside the conductor plate, without generating an eddy current along the passing direction of the conductor plate in width-direction end portions of the conductor plate.

13. The induction heating device according to claim 11, wherein
each of the eddy currents forms one closed loop passing through region on a first surface side of the conductor plate and region on a second surface side of the conductor plate sandwiching center in plate thickness direction of the conductor plate.

14. The induction heating device according to claim 1, wherein
by the magnetic fields opposite to each other in the plate thickness direction of the conductor plate, eddy currents opposite to each other in direction are generated in two regions with a distance therebetween in the passing direction of the conductor plate, the two regions being regions vertical to the passing direction of the conductor plate inside the conductor plate, without generating an eddy current along the passing direction of the conductor plate in width-direction end portions of the conductor plate.

15. The induction heating device according to claim 1, wherein
each of the eddy currents forms one closed loop passing through region on a first surface side of the conductor plate and region on a second surface side of the conductor plate sandwiching center in plate thickness direction of the conductor plate.

16. An induction heating method being an induction heating method to, by using an induction heating device including:
a first coil that generates a magnetic field in a plate thickness direction of a conductor plate by an alternating current flowing therethrough; and
a second coil that generates a magnetic field in the plate thickness direction of the conductor plate by an alternating current flowing therethrough, in which
the first coil and the second coil are positioned to sandwich the conductor plate therebetween, and
the first coil and the second coil are substantially the same in position in a passing direction of the conductor plate, inductively heat the passing conductor plate, the method comprising:
generating magnetic fields that are opposite to each other in direction in the plate thickness direction of the conductor plate from the first coil and the second coil by the alternating currents;
generating eddy currents inside the conductor plate by the magnetic fields opposite to each other in the plate thickness direction of the conductor plate; and
inductively heating the conductor plate by the eddy currents.

* * * * *